US011164539B2

(12) United States Patent
Morrell et al.

(10) Patent No.: US 11,164,539 B2
(45) Date of Patent: Nov. 2, 2021

(54) SYSTEMS AND METHODS FOR BANDWIDTH REDUCTION IN VIDEO SIGNAL TRANSMISSION

(71) Applicant: ROSS VIDEO LIMITED, Iroquois (CA)

(72) Inventors: Garn H. Morrell, Kaysville, UT (US); David Austin Tubbs, Sandy, UT (US)

(73) Assignee: ROSS VIDEO LIMITED, Iroquois (CA)

( * ) Notice: Subject to any disclaimer, the term of this patent is extended or adjusted under 35 U.S.C. 154(b) by 0 days.

(21) Appl. No.: 16/718,593

(22) Filed: Dec. 18, 2019

(65) Prior Publication Data

US 2021/0193076 A1    Jun. 24, 2021

(51) Int. Cl.
*G09G 5/00* (2006.01)
*G09G 5/14* (2006.01)

(52) U.S. Cl.
CPC .............. *G09G 5/005* (2013.01); *G09G 5/14* (2013.01); *G09G 2350/00* (2013.01); *G09G 2370/16* (2013.01); *G09G 2370/20* (2013.01); *G09G 2370/24* (2013.01)

(58) Field of Classification Search
CPC ........ G09G 5/05; G09G 5/14; G09G 2350/00; G09G 2370/16; G09G 2370/20; G09G 2370/24

See application file for complete search history.

(56) References Cited

U.S. PATENT DOCUMENTS

| 7,353,458 | B2 | 4/2008 | Malmstrom | |
|---|---|---|---|---|
| 7,496,846 | B2 | 2/2009 | Malmstrom | |
| 7,770,131 | B2 | 8/2010 | Malmstrom | |
| 7,779,361 | B2 | 8/2010 | Malmstrom | |
| 2004/0184523 | A1* | 9/2004 | Dawson | H04N 21/658 375/240.1 |
| 2007/0274382 | A1* | 11/2007 | Hickey | H04N 19/42 375/240.03 |

(Continued)

OTHER PUBLICATIONS

S. Mittal and J. Vetter, "A Survey of Architectural Approaches for Data Compression in Cache and Main Memory Systems," IEEE Transactions on Parallel and Distributed Systems, (2016) vol. 27, No. 5, pp. 1524-1536.

(Continued)

*Primary Examiner* — Brent D Castiaux
(74) *Attorney, Agent, or Firm* — Lando & Anastasi, LLP

(57) ABSTRACT

Reduced-bandwidth versions of display signals that are currently being provided as outputs by multiple computer systems are received and processed for output, at another computer system, of a representation of each of the display signals. The received reduced-bandwidth versions may include, for example, versions of display signals that are generated by applying any one or more of the following to each of the display signals: scaling, segmenting, and compression. At a transmit side, respective requests for different reduced-bandwidth versions of a display signal that is currently being provided as an output by a computer system are received from multiple other computer systems. The different reduced-bandwidth versions of the display signal are generated and transmitted to the requesting computer systems responsive to the requests.

32 Claims, 11 Drawing Sheets

(56) References Cited

U.S. PATENT DOCUMENTS

| | | | | |
|---|---|---|---|---|
| 2008/0168118 A1* | 7/2008 | Hickey | ............ | G06F 13/385 |
| | | | | 709/201 |
| 2008/0174604 A1* | 7/2008 | Malmstrom | ......... | G09G 5/003 |
| | | | | 345/522 |
| 2018/0191996 A1* | 7/2018 | Malemezian | ........ | G06F 3/1423 |

OTHER PUBLICATIONS

Matrox Graphics, Inc., "Exceptional Remote Performance at Low Bitrate—Matrox® ExtioTM 3 High-Performance IP KVM Extenders," (2019) 8 pages.

\* cited by examiner

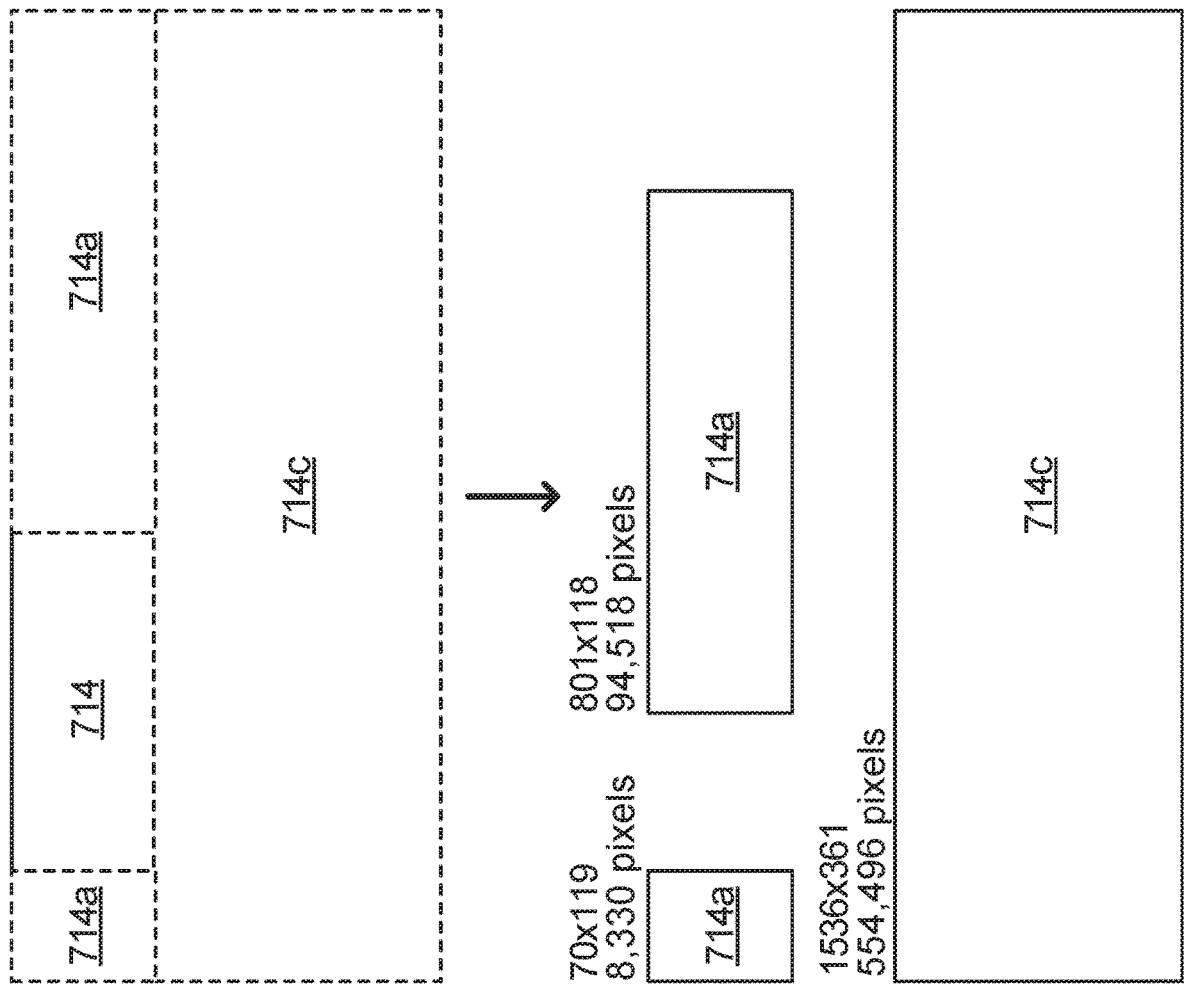

SYSTEMS AND METHODS FOR BANDWIDTH REDUCTION IN VIDEO SIGNAL TRANSMISSION

The present disclosure relates generally to video systems and, in particular, to bandwidth reduction for transmission of video signals, across a computer network in Keyboard, Video, and Mouse (KVM)-based systems in some embodiments.

BACKGROUND

Transmission of uncompressed or "baseband" video signals across a data network utilizes a substantial amount of network bandwidth, and in many cases can require more network bandwidth than is available. When "live" video signals from multiple sources are to be merged together for display for example, the bandwidth problem is multiplied for each video source that is added.

A pixel is a single unit of video data, and may include red, green, and blue color components, for example. For 8-bit color systems, each color component has 256 possible levels of intensity, based on the number of values that may be represented with an 8-bit byte. With three bytes, one each for red, green, and blue color components of a pixel, up to 16,777,216 unique colors may be specified and displayed.

A video frame captures one static, motionless image. Each video frame includes a number of scans or lines, each scan includes multiple individual pixels, and each of the pixels may be any color. The scans are typically organized such that indexing of scans begins at the top of a video frame, moving downwards, and pixels are indexed from the left side of a video frame to the right side of the video frame.

Just one video frame using 8-bit red, green, blue (RGB) color definition includes millions of bytes. Considering the fact that generating motion in video involves displaying multiple video frames per second, it should be apparent that transmitting video signals can require quite a high amount of bandwidth.

In general, techniques for reducing bandwidth associated with transmitting video signals may be desirable.

SUMMARY

Embodiments disclosed herein provide mechanisms for reducing bandwidth requirements for video signal transmission. Such mechanisms may be applied, for example, to transmission of video signals from multiple video sources across a computer network for display together on a computer display, illustratively in a KVM system.

According to an aspect of the present disclosure, a method involves receiving, at a first computer system, respective reduced-bandwidth versions of display signals that are currently being provided as outputs by a plurality of second computer systems; and processing the received reduced-bandwidth versions for output, at the first computer system, of a representation of each of the display signals.

The received reduced-bandwidth versions may include a scaled version of one of the display signals, in which case a method may also involve displaying the scaled version as the representation of the one of the display signals.

In some embodiments, the received reduced-bandwidth versions include a version that includes a segment of one of the display signals, and the processing involves reconstructing, as the representation of the one of the display signals, the segment of the one of the display signals with a remainder of the one of the display signals that is available at the first computer system.

The received reduced-bandwidth versions may include multiple versions of one of the display signals, with the multiple versions including respective segments of the one of the display signals. In such embodiments, the processing may involve reconstructing, as the representation of the one of the display signals, the respective segments of the one of the display signals with a remainder of the one of the display signals that is available at the first computer system.

In another embodiment, the received reduced-bandwidth versions include a compressed version of one of the display signals, and the processing involves decompressing the compressed version of the one of the display signals to generate a decompressed version of the one of the display signals.

Combinations of features are also possible. For example, the received reduced-bandwidth versions may include respective versions of the display signals generated by applying any one or more of the following to each of the display signals: scaling, segmenting, and compression.

A method may also involve requesting the received reduced-bandwidth versions, for example by transmitting a respective request to each of the second computer systems, with each respective request specifying one or more parameters of bandwidth reduction to be used by each of the second computer systems in generating a reduced-bandwidth version of one of the display signals.

The first computer system and the second computer systems are part of a KVM system in other embodiments, although other applications are also possible.

An apparatus according to another aspect of the present disclosure include a communication interface and a video signal processor, coupled to the communication interface, to receive through the communication interface respective reduced-bandwidth versions of display signals that are currently being provided as outputs by a plurality of computer systems, and to process the received reduced-bandwidth versions for output of a representation of each of the display signals.

In an embodiment in which the received reduced-bandwidth versions include a scaled version of one of the display signals, an apparatus may also include a display controller, coupled to the video signal processor, to control a display to display the scaled version as the representation of the one of the display signals.

The received reduced-bandwidth versions may include a version that includes a segment of one of the display signals, in which case the video signal processor may be configured to reconstruct, as the representation of the one of the display signals, the segment of the one of the display signals with a remainder of the one of the display signals that is available to the video signal processor.

In another embodiment, the received reduced-bandwidth versions include multiple versions that include segments of one of the display signals, and the video signal processor is configured to reconstruct, as the representation of the one of the display signals, the respective segments of the one of the display signals with a remainder of the one of the display signals that is available to the video signal processor.

The received reduced-bandwidth versions may also or instead include a compressed version of one of the display signals, in which case the video signal processor is configured to decompress the compressed version of the one of the display signals to generate a decompressed version of the one of the display signals.

In general, the received reduced-bandwidth versions may include respective versions of the display signals generated by applying any one or more of the following to each of the display signals: scaling, segmenting, and compression.

Some embodiments involve requests, and therefore the video signal processor may be configured to receive the reduced-bandwidth versions in response to one or more requests for the received reduced-bandwidth versions. The one or more requests may include a respective request to each of the computer systems, each respective request specifying one or more parameters of bandwidth reduction to be used by each of the computer systems in generating a reduced-bandwidth version of one of the display signals.

As noted elsewhere herein, KVM applications are possible. Therefore, in some embodiments the plurality of computer systems are part of a KVM system.

Another aspect of the present disclosure relates to a non-transitory processor-readable medium storing instructions which, when executed by a processor, cause the processor to perform a method that involves: receiving, at a first computer system, respective reduced-bandwidth versions of display signals that are currently being provided as outputs by a plurality of second computer systems; and processing the received reduced-bandwidth versions for output, at the first computer system, of a representation of each of the display signals.

According to a further aspect of the present disclosure, a method involves receiving, from a plurality of first computer systems, respective requests for different reduced-bandwidth versions of a display signal that is currently being provided as an output by a second computer system; and generating and transmitting the different reduced-bandwidth versions of the display signal to the plurality of first computer systems responsive to the requests.

Generating the different reduced-bandwidth versions may involve applying any one or more of the following to the display signal: scaling, segmenting, and compression.

An apparatus in accordance with yet another aspect of the present disclosure includes a communication interface; and a display signal processor, coupled to the communication interface, to receive through the communication interface from a plurality of first computer systems respective requests for different reduced-bandwidth versions of a display signal that is currently being provided as an output by a second computer system, and to generate and transmit through the communication interface the different reduced-bandwidth versions of the display signal to the plurality of first computer systems responsive to the requests.

The display signal processor may be configured to apply any one or more of the following to the display signal to generate the different reduced-bandwidth versions: scaling, segmenting, and compression.

In another embodiment of a non-transitory processor-readable medium, the medium stores instructions which, when executed by a processor, cause the processor to perform a method that involves receiving, from a plurality of first computer systems, respective requests for different reduced-bandwidth versions of a display signal that is currently being provided as an output by a second computer system; generating and transmitting the different reduced-bandwidth versions of the display signal to the plurality of first computer systems responsive to the requests.

Other aspects and features of embodiments of the present disclosure will become apparent to those ordinarily skilled in the art upon review of the following description.

BRIEF DESCRIPTION OF THE DRAWINGS

Examples of embodiments of the invention will now be described in greater detail with reference to the accompanying drawings.

FIGS. 7B to 7H are block diagram illustrations of video segments associated with parts of the example video display screen in FIG. 7A.

DETAILED DESCRIPTION

Figure 1:
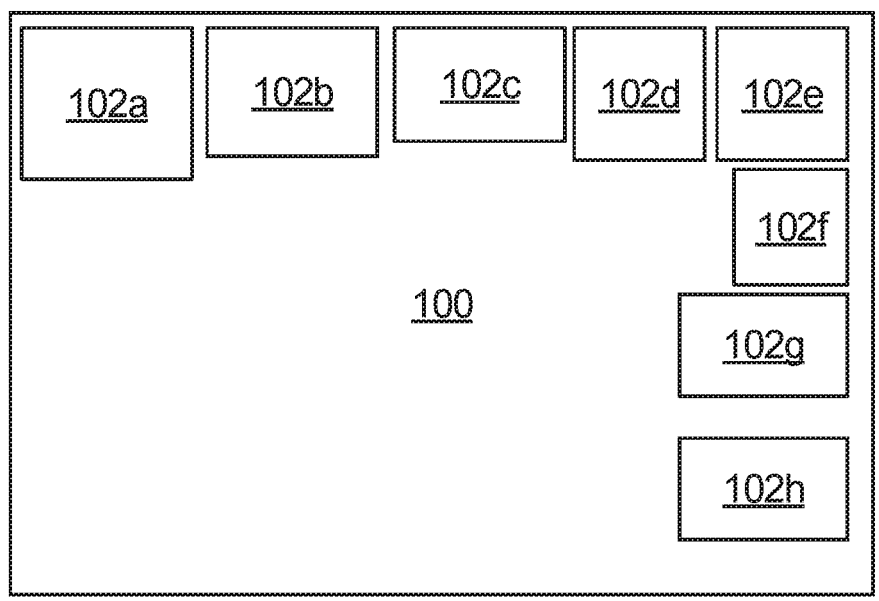
FIG. 1 is a block diagram illustrating an example of an integrated video display screen including representations of multiple video signals.

Example embodiments are discussed in detail herein. It should be appreciated, however, that the present disclosure provides concepts that can be embodied in any of a wide variety of specific contexts. The embodiments discussed are merely illustrative, and do not limit the scope of the present disclosure.

To generate motion in video, a number of video frames are delivered, one after another and in a sequence, to a display. The frames are displayed at a speed such that the separate, static video frames are perceived to be in motion when viewed by the human eye.

For instance, one current High Definition Television (HDTV) format used for computers and televisions in the United States and other countries is known as "1080p", provides 1920 pixels per scan and 1080 scans per frame, and presents 60 progressive frames per second. With this information, it is possible to calculate the amount of data involved in transmitting a 1080p video stream across a computer network, as an illustrative example.

For 8-bit RGB color, each pixel has a size of 3 bytes. One scan, line, or row of pixels at 1920 pixels per scan in this example includes 5,760 bytes (1920 pixels*pixel size of 3 bytes). One frame within a 1920×1080p video stream in this example requires 6,220,800 bytes (1080 scans*scan size of 5,760 bytes). Extending this to a video stream at 60 frames per second determines a data rate of 373,248,000 bytes per second (1 frame at 6,220,800 bytes per frame*60 frames per second).

Consequently, a minimum bandwidth of approximately 373 megabytes/second is required for transmission of a video signal according to the current 1080p standard. Typically, a higher rate is required due to additional overhead carried by a computer network. Many computer networks are rated in megabits/second or gigabits/second instead of units of bytes/second, and a common industry practice is to multiply the byte count by 10 to arrive at an approximate "bits-per-second" value. In the above example, applying this practice would determine a network bandwidth for a video stream to be approximately 3.732 gigabits/second (1080p video stream byte count of 373,248,000*10). Considering the fact that many home and business networks run at 1 gigabit/second, the delivery of even one uncompressed video stream exceeds the bandwidth of these networks by more than three times.

Bandwidth requirements may be further increased by the use of higher color resolution, such as 10 or 12 bits for each color, found in emerging video standards. For example, a color resolution using three 10-bit color components per pixel yields more than one billion possible colors per pixel, and the use of 12-bit color components within each pixel yields more than 65 billion colors per pixel, compared to under 17 million colors per pixel for 8-bit color components. However, a 30-bit pixel 1080p video stream with three 10-bit color components per pixel requires 497,664,000 bytes or nearly 5 gigabits/second bandwidth, and a 36-bit pixel 1080p video stream with three 12-bit color components per pixel requires 622,080,000 bytes or more than 6.22 gigabits/second bandwidth.

Bandwidth can become even more of an issue in video display systems with a plurality of video sources. FIG. 1 is a block diagram illustrating an example of an integrated video display screen 100 that includes representations of multiple video signals. Those skilled in the art will appreciate that "video source" is often used interchangeably to denote a source of a video stream, such as a personal computer, a laptop, a server, etc., and a video signal associated with such a source. In the present disclosure, "video source" is used primarily to denote a source of a video stream, and "video signal" is used primarily to denote a flow of video information from a video source through a medium to a destination.

The example video display screen 100 includes representations of eight video signals 102a, 102b, 102c, 102d, 102e, 102f, 102g, 102h. The video signal representations 102a-h are from eight different computer systems in some embodiments, and are scaled to fit within the single video display screen 100. In the example shown, five of the eight video signal representations 102a-e are displayed horizontally across the top of the video display screen 100 and the three remaining video signal representations 102f-h are displayed vertically along the right side of the video display screen 100. Other layouts are also possible.

As an example, suppose that each computer system for which a video signal representation 102a-h is displayed in the video display screen 100 uses the 1080p format. The total network bandwidth required to deliver all eight video streams for display in the display screen 100 would be approximately 29.856 gigabits/second for just 8-bit color components (3.732 gigabits/second per video signal*8 video signals).

Transmission of such baseband computer video, across a data network for example, may require much more bandwidth than is available. Considering an earlier example of 1 gigabit/second computer networks, the 29.856 gigabits/second requirement for the example video display screen 100 and 1080p video signals with 8-bit color components is nearly thirty times the available bandwidth. Such bandwidth deficiencies may be even more of an issue when further video sources or video signals are added, higher definition video sources or video signals are involved, higher color resolutions are used, and/or network bandwidth is lower, for example.

Video display screens such as the example 100 shown in FIG. 1 are often used in KVM systems, for example. In such systems, computer resources may be located remotely from user or operator stations, to which video outputs that are currently being displayed from multiple computer resources are delivered for simultaneous display in video display screens.

Figure 2:
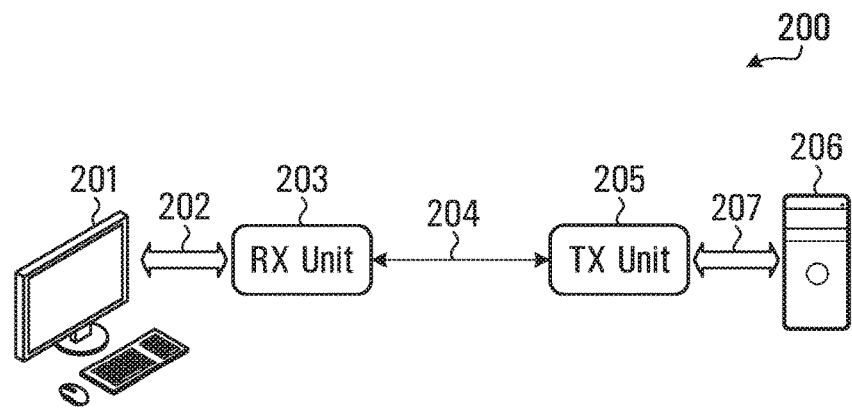
FIG. 2 is a block diagram of an example system in which an embodiment may be implemented, in particular a KVM extender system to support the implementation of a computer resource extended some distance to a remote user station.

FIG. 2 is a block diagram of an example system in which an embodiment may be implemented, in particular a KVM extender system to support the implementation of a computer resource extended to a remote user station, such as in a separate room or building. In the example system 200, a user station 201 is coupled to a receive (RX) unit 203 through a connection 202. The RX unit 203 is also coupled to a transmit (TX) unit 205 through a connection 204, and the TX unit 205 is coupled to a computer resource 206 by a connection 207.

In a KVM system, a user station 201 includes three primary components, namely a keyboard, a video display, and a mouse, various examples of which will be familiar to those skilled in the art. Audio may also be embedded with a video stream or may use a separate, discrete audio connection scheme, and output to a user through an audio device such as a speaker. A keyboard, a video display, a mouse, and an audio device are examples of I/O devices that may be provided at the user station 201, and others may also or instead be provided. For instance, the user station 201 may include an I/O device such as a touchscreen to provide multiple I/O features in one I/O device.

A communication interface at the user station 201 is coupled to at least the user station I/O component(s) in order to enable the user station to communicate with the remote computer resource 206, and thereby enable the computer resource to be monitored and/or operated from the user station for example. The communication interface at the user station 201 provides a connectivity path not only for video, but also or instead for audio associated with video in some KVM embodiments.

In general, a communication interface includes some sort of physical component such as a physical port or connector, and may also include one or more other components to support communications through that port or connector. The particular structure of a communication interface will be dependent upon such characteristics as the type of connection over which communications are to be supported and/or the communication protocol(s) that are to be supported, for example. In some embodiments, the user station 201 includes one or more video connectors. One or more audio connectors and/or one or more other types of connectors such as Universal Serial Bus (USB) connectors may also or instead be provided in the user station 201.

In a KVM system, the connection 202 typically includes at least a video cable. An audio cable may also or instead be provided. Other types of connections are also possible, including one or more USB cables for example. The present disclosure is not limited to any particular type of connection 202. In general, the connection 202 may be or include one or more wired and/or wireless connections, and compatible interfaces are provided at the user station 201 and the RX unit 203. In some embodiments, an RX unit is integrated into a user station instead of a separate component 203 as shown. In such embodiments, the connection 202 is an internal connection within a user station.

The RX unit 203 includes one or more communication interfaces compatible with the connections 202, 204. The same interface(s) or type(s) of interface may be compatible with both of the connections 202, 204. In other embodiments, different interfaces are provided for one or more connections 202 to the user station 201 and for one or more connections 204 to the TX unit 205. For example, the connections 202, 204 may be different types of connections. The RX unit 203 may include one or more interfaces of the same type as, or at least compatible with, one or more interfaces at the user station 201, as well as one or more interfaces of the same type as, or at least compatible with, one or more interfaces at the TX unit 205.

The RX unit 203 also includes at least a signal handler, which may be implemented using hardware, firmware, components which execute software, or some combination thereof. Electronic devices that might be suitable for this purpose include, among others, microprocessors, microcontrollers, Programmable Logic Devices (PLDs), Field Programmable Gate Arrays (FPGAs), Application Specific Integrated Circuits (ASICs), and other types of "intelligent" integrated circuits. A signal handler is intended to generally refer to a component, or multiple components, to handle transfer of signals through the RX unit 203. Such signals may be transferred from the TX unit 205 to the user station 201 and/or from the user station to the TX unit. The RX unit 203 may include one or more other components such as one or more display controllers, one or more signal converters, one or more signal translators, one or more signal processors, and/or one or more components configured to perform operations related to communications with the user station 201 and/or the TX unit 205. Implementation options for such components include at least those outlined above for a signal handler. In some embodiments a single processor or other physical device or circuitry is used to implement a signal handler and other components of the RX unit 203.

In the example system 200, the connection 204 is represented differently than the connections 202, 207, to illustrate that different connection types are expected to be implemented between the RX unit 203 and the TX unit 205 than between the RX unit and the user station 201 or between the TX unit and the computer resource 206. For example, the user station 201 in a KVM system may be located remotely from the computer resource 206. In some embodiments, the connections 202, 207 are local or relatively short-range connections, and the connection 204 is a relatively long-range connection intended for communications over a longer distance than connections 202, 207. The connection 204 connects the RX unit 203 and the TX unit 205 via a network, illustratively through an IP connection, in some embodiments. Such a connection may be over copper cabling to support a distance of up to approximately 100 m or 300 feet and beyond, or optical fiber cabling to support a distance up to approximately 40 km or 25 miles and beyond. As another example, microwave relays could be used at 204 to connect the RX unit 203 and the TX unit 205. The present disclosure is not limited to any particular type of connection 204, and in general the connection 204 may be or include one or more wired and/or wireless connections, and compatible interfaces are provided at the RX unit 203 and the TX unit 205.

The TX unit 205 is a counterpart to the RX unit 203, and these units have the same structure or at least similar structures in some embodiments. The TX unit 205 at least has a communication interface that is the same as, or is otherwise compatible with, a communication interface of the RX unit 203, to support communications over the connection 204. The TX unit 205 also includes at least a signal handler and one or more communication interfaces compatible with the connection 207. Other components, such as those noted above for the RX unit 203, may also or instead be provided at the TX unit 205. At least the implementation examples provided above for the RX unit communication interfaces, signal handler, and/or other components also apply to the TX unit 205.

Similarly, the connection 207 may be or include the same type(s) of connection as the connection 202. In some embodiments, the TX unit 205 is part of a computer resource, and the connection 207 is an internal connection in the computer resource. It is expected that the RX unit 203 and the TX unit 205 support the same type(s) of connections 202, 207, but this is not necessarily the case in all embodiments.

The computer resource 206 represents a computer system that includes such components as one or more I/O devices, one or more memory devices, and a processor to perform any of various operations. Although the present disclosure is not restricted to implementation in conjunction with any particular type of computer resource or other video source, in some embodiments the computer resource 206 is a computer system such as a video server or other component in a video production system. In some embodiments, the computer resource 206 may be a laptop or desktop computer; in other embodiments, the computer resource 206 may be a server system, including physical servers that host multiple virtual machines.

A computer resource 206, or more generally any video source, may use analog signals such as modulated electrical voltages to represent a video picture or video stream, and/or use digital data signals to represent a video picture or video stream. Such signals may be transferred via one or more media, including an electrical medium through electrical cabling, a Radio Frequency (RF) or "radio" medium over the air, a light medium through lasers and fiber optic cabling, etc. The present disclosure is not limited to only analog signals or only digital signals, or to any particular media for transferring signals.

In operation, the RX unit 203 receives at least video output signals of the remote computer resource 206, from the TX unit 205, and provides the received signal(s) to the user station 201 for presentation to a user, through a display such as a video monitor at the user station. The RX unit 203 also receives signals from the user station 201, including local mouse and/or keyboard data in the case of a KVM system, and sends these signals to the TX unit 205. At the computer resource side of the example system 200, the TX unit 205 obtains and sends, to the RX unit 203, video output signals that are currently being output by the computer resource 206, and also receives user station signals, including mouse and/or keyboard data in an example above, from the RX unit and provides those signals to the computer resource to control the computer resource.

The RX and TX designations of the RX unit 203 and the TX unit 205 are in reference to transfer of video and/or audio signals between the user station 201 and the computer resource 206 across a bidirectional connection 204. These designations are not intended to indicate or imply that an RX unit is only able to receive or that a TX unit is only able to transmit, or even that video and/or audio signals may only flow in a direction from a TX unit to an RX unit. For example, some audio transfers can be conveyed in the opposite direction in some embodiments. Also, the RX unit 203 may also transmit signals such as local mouse and/or keyboard data from the user station 201 to the computer resource 206, and the TX unit 205 may receive such signals from the RX unit.

Any of various approaches could be implemented to control signal transfer between the RX unit 203 and the TX unit 205. For example, the TX unit 205 may be configured to obtain and transmit output signals from the computer resource 205 responsive to a command or request from the RX unit 203. The RX unit 203 may be configured to send requests or commands for computer resource video and/or audio under control of the user station 201. A user could initiate a request or command to the RX unit 203 using an input device such as a keyboard or mouse at the user station 201, for example, or the user station 201 itself may automatically generate requests or commands or otherwise initiate video/audio signal transfer from the computer resource 206. In other embodiments, the TX unit 205 periodically obtains and transmits output signals from the computer resource 206 to the RX unit 203. The RX unit 203 may also or instead periodically and automatically generate and transmit requests or commands to the TX unit 205, and the TX unit then obtains and transmits output signals from the computer resource to the RX unit in response to those periodic requests or commands. Video and/or audio signal transfer may also or instead be initiated by the computer resource 206 itself. Embodiments that support both automatic and request-driven or command-driven computer resource video and/or audio transfer are also possible.

In some embodiments, a user or operator at the user station 201 selects the computer resource 206 for remote access. This is also referred to as attaching the user station 201 to the computer resource 206.

Figure 3:
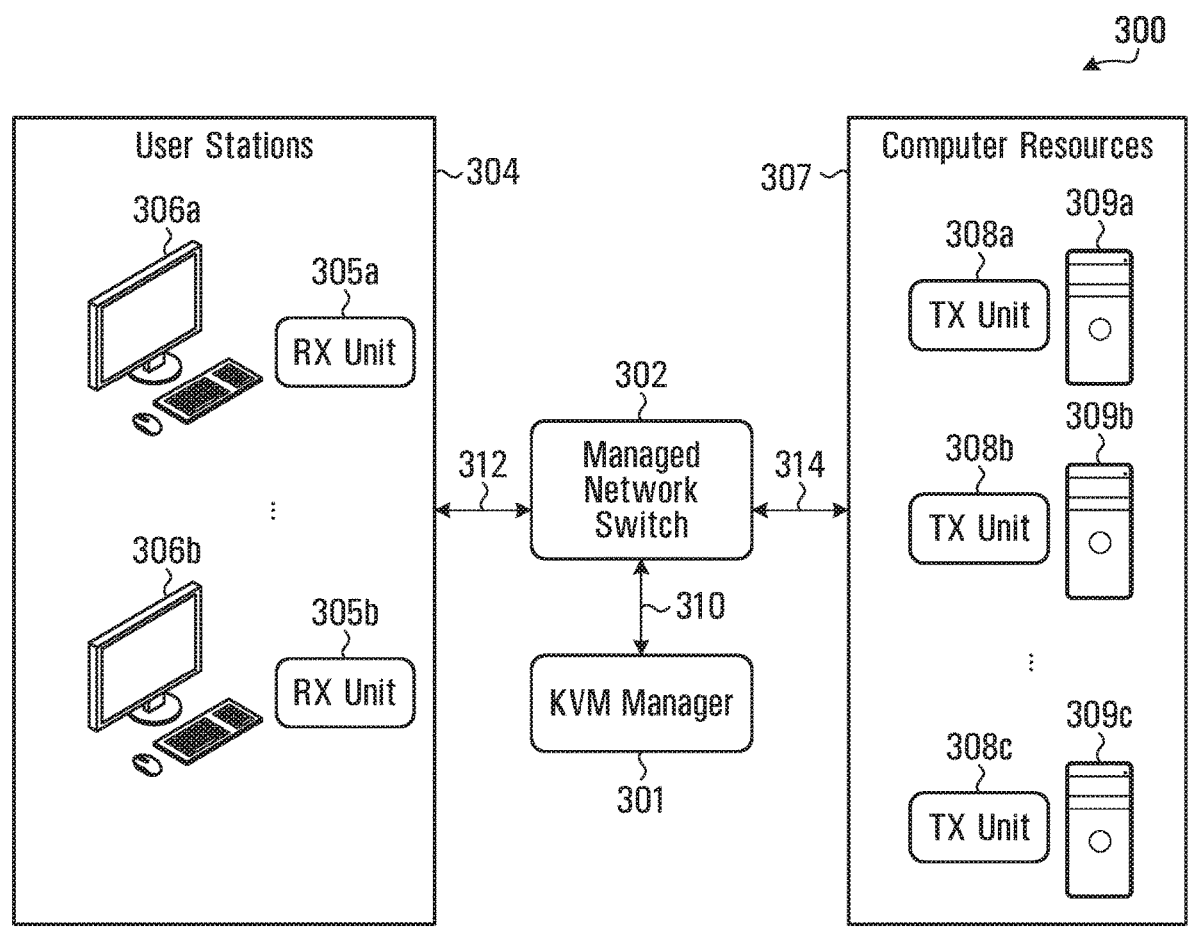
FIG. 3 is a block diagram of another example system in which an embodiment may be implemented, in particular a KVM matrix to support remote access to multiple computer resources by multiple user stations.

FIG. 3 is a block diagram of another example system in which an embodiment may be implemented, in particular a KVM matrix 300 to support remote access to multiple computer resources by multiple user stations. In a sense, FIG. 3 can be considered as extrapolating the concept of the KVM extender shown in FIG. 2 to a matrix allowing multi-user access to multiple computer resources. In FIG. 3, a KVM manager 301 is coupled to a managed network switch 302 through a connection 310. The managed network switch 302 is coupled to a set 304 of user stations by one or more connections, represented by a connection 312 in FIG. 3. In order to avoid further congestion in the drawing, a single connection 312 is shown in FIG. 3, but it should be appreciated that there may be multiple connections in some embodiments. For example, each RX unit 305a, 305b may have its own respective connection to the managed network switch 302. In general, the managed network switch 302 is coupled to a set 304 of user stations by a set of one or more connections represented at 312.

The set 304 of user stations includes a number of receiver units 305a, 305b coupled to respective user stations 306a, 306b. Although two user stations 306a, 306b and two RX units 305a, 305b are shown, there may be more than two user stations and/or RX units in other embodiments. In addition, although a respective RX unit 305a, 305b is coupled to each user station 306a, 306b, in other embodiments a single RX unit may be coupled to and serve multiple user stations.

The managed network switch 302 is also coupled to a set 307 of computer resources through one or more connections, represented by a connection 314. As noted above with reference to the connection 312, although a single connection 314 is shown in FIG. 3 to avoid further congestion in the drawing, there may be multiple connections in some embodiments. Each TX unit 308a, 308b, 308c may have its own respective connection to the managed network switch 302, for example. More generally, the managed network switch 302 is coupled to a set 307 of computer resources by a set of one or more connections represented at 314.

The set 307 of computer resources includes TX units 308a, 308b, 308c respectively coupled to computer resources 309a, 309b, 309c. Although three computer resources 309a, 309b, 309c and three TX units 308a, 308b, 308c are shown, there may be more or fewer than three computer resources and/or TX units in other embodiments. Also, a respective TX unit 308a, 308b, 308c is coupled to each computer resource 309a, 309b, 309c, in other embodiments a single TX unit may be coupled to and serve multiple computer resources.

In general, a KVM system may include more or fewer components than shown. For example, it is expected that most KVM installations will include more computer resources than user stations. A relatively small office installation may include ten to twenty computer resources and only five to ten user stations, whereas a video production control room might include one hundred to two hundred computer resources and twenty-five to fifty user stations, for example.

The equipment and computing resources associated with a KVM system such as the KVM matrix 300 may be installed in a secure, environmentally controlled data center or equipment room, for example. Such equipment and computing resources may include at least the KVM manager 301, the managed network switch 302, the set 307 of computing resources and the set 314 of connections in some embodiments. The user stations in the set 304 are at one or more remote locations, remote from at least the set 307 of computer resources. The managed network switch 302 may be co-located with the set 307 of computer resources and/or the KVM manager 301, or even be co-located with one or more of the user stations 306a-b. In other embodiments, the managed network switch 302 is remote from all of the other KVM matrix components.

Examples of user stations, RX units, TX units, and computer resources are provided elsewhere herein. At least the above examples relating to the connection 204 in FIG. 2 also apply to the connections 312, 314. Connections between the RX units 305a-b and the TX units 308a-c in FIG. 3 are switched connections through the managed network switch 302 in the example KVM matrix 300. Switched connections may also or instead be used in a KVM extender system such as the example system 200 in FIG. 2, but the RX unit-TX unit connections are shown differently in FIGS. 2 and 3 solely for illustrative purposes. Switched connections are not limited only to KVM matrix embodiments, at least to the extent that at least some form of switching may be performed in any network connection, for example.

Any of various types of managed network switches, examples of which are commercially available and known to those skilled in the art, may be implemented at 302. The present disclosure is not restricted to any particular type of network switch or connection mechanism.

The connection 310 between the KVM manager 301 and the managed network switch 302 provides a link to enable the KVM manager 301 to receive data from and/or to transmit data to the RX units 305a-b and/or the TX units 308a-c. Data flowing across the connection 310 may include, for example, any of: requests and/or status information from RX units 305a-b and/or TX units 308a-c to the KVM manager 301; commands and/or status information from the KVM manager 301 to the RX units and/or the TX units; and configuration and/or upgrade commands for the RX units and/or the TX units, issued by Information Technology (IT) personnel connected through a Graphical User Interface (GUI) implemented on the KVM manager 301 for example. These examples of data that may be transferred across the connection 310 are not exhaustive. In some embodiments, the connection 310 may be implemented as a copper network cable; in other embodiments, the connection 310 may be implemented as a fiber-optic cable; and still other embodiments combine the managed network switch 302 and the KVM manager 301 into a single system, and the connection 310 is an internal connection within the combined system.

The KVM manager 301 includes at least a controller and a communication interface to support communications with the managed network switch 302. At least the controller may be implemented using hardware, firmware, components that execute software, or some combination thereof. Examples of electronic devices that might be suitable for this purpose are provided elsewhere herein, at least above.

The KVM manager 301 provides control over other components within the KVM matrix 300. For example, the KVM manager 301, or more specifically a controller therein, may route and/or otherwise process all requests issued by any of the RX units 305a-b to connect to any of the TX units 308a-c. In some embodiments, an operator at a user station 306a-b may select any one of the remote computer resources 309a-c, which is then "attached" to that user station to give the user full and exclusive control of the selected computer resource. Other operators at other user stations 306a-b can similarly select and attach to any of the available computer resources 309a-c. Such computer resource selection generates requests that are routed to the KVM manager 301 by the RX units 305a-b, and attachment of computer resources 309a-c to user stations 306a-b is managed by the KVM manager 301 based on the requests.

It should be noted that multi-user access to computer resources is not necessarily exclusive. For example, in some embodiments a single computer resource may be simultaneously accessed by multiple users through multiple user stations. Even with shared access, some aspects of access may be exclusive. One user station may have exclusive control of a computer resource that is being accessed by multiple user stations, for example.

The KVM manager 301 may also or instead implement other features such as adding user stations and/or computer resources to the KVM matrix or removing user stations and/or computer resources from the KVM matrix. The KVM manager 301 may also or instead be configured to manage user accounts across the matrix 300 and enforce particular user-based access rights to any of the computer resources 309a-c from any of the user stations 306a-b. In some embodiments, the KVM manager 301 provides named system access, illustratively through the use of menus of any of the RX units 305a-b. Regarding named system access, rather than address systems by a number or address such as "192.168.3.54", in some embodiments components such as TX units and/or RX units can also or instead be assigned textual or otherwise more user-friendly names such as "Reactor Cooling Control" or "News Server 3". Software upgrades may also be made across the system through the KVM manager 301. Other features may also or instead be provided in other embodiments.

KVM systems are an illustrative example of one type of system in which integrated, multi-source video display screens are often used and for which bandwidth limitations may be particularly challenging. The present disclosure is not in any way limited to KVM systems. Embodiments disclosed herein may also or instead be applied to video signal transmission in other types of systems and not only KVM systems. For example, embodiments need not necessarily be implemented in or in conjunction with RX units and/or TX units. RX units and TX units are not the only types of interface components through which video signals may be transmitted between video sources and systems at which the video signals are to be displayed and/or otherwise used or processed. Embodiments are also not in any way restricted to implementation in conjunction with systems in which video sources are necessarily computer resources and integrated video display screens are necessarily presented at user stations.

In general, embodiments disclosed herein relate to reducing bandwidth requirements associated with the delivery of video signals from one or more video sources to one or more targets, across a computer network for example. A video source may send video data to a source-side or transmitter-side component or subsystem for bandwidth reduction processing and transmission to a target-side or receiver-side component or subsystem for further processing, for display for example. Reduced-bandwidth versions of multiple video signals may be transmitted to and received by a single target, and/or multiple reduced-bandwidth versions of a video signal may be generated for transmission to one or more targets.

There are several possible embodiments of a target to which video signals are transmitted. Examples include but are not restricted to: a single video display, an array of video monitors, a frame buffer implemented in computer hardware, a video printer, and a video storage device.

In some embodiments, a receiving unit is coupled to one or more output devices such as a computer monitor, and a transmitting unit is coupled to one or more video sources and transmits video signals, across a computer network for example, to one or more receiving units. The RX units 203, 305a-b and the TX units 205, 308a-c in FIGS. 2 and 3 are illustrative but non-limiting examples of a receiving unit and a transmitting unit. Various video signal transmit-side and receive-side features are disclosed herein in the context of a receiving unit and a transmitting unit, but as noted elsewhere such features are not restricted exclusively to RX units and/or TX units, or to a KVM system.

A receiving unit, or one or more particular components or subsystems thereof, may be configured to manage requests for the display of video signals from one or more video sources at specific sizes, screen locations, and/or overlaps, in a video display screen for example. A receiving unit, component, or subsystem may also or instead be configured to request video signals or segments thereof from one or more video sources or from one or more transmitting units coupled to the video source(s). In some embodiments, received video signals or segments are added to a local display or a display memory called a display canvas. This is another example of a feature that may be provided or supported by a receiving unit, component, or subsystem. In embodiments that include a display canvas, a receiving unit, component or subsystem may be configured to map the display canvas to one or more output devices, such as computer monitors and/or other types of displays.

Bandwidth reduction may involve compression, as discussed in further detail elsewhere herein. A receiving unit, component, or subsystem may provide support for decompression of compressed video signals or segments.

These and other receive-side features are described in further detail below, in part with reference to FIG. 4, which is a block diagram of a receiving unit in accordance with an embodiment. In addition to an example receiving unit 400, FIG. 4 also includes a network 402 and a display 418, with which the receiving unit 400 operates in some embodiments. It should be appreciated, however, that a receiving unit 400 need not include such components or subsystems as a network 402 or a display 418, which are shown separately from the example receiving unit in FIG. 4.

The network 402 may be any type of network to enable the receiving unit 400 to communicate with one or more remote components, such as one or more video sources and/or one or more transmitting units. Wired and/or wireless communications may be supported.

The display 418 may be or include one or more computer monitors and/or other types of devices that provide video outputs to a user. Although it is expected that video signals that are received by a receiving unit 400 will be displayed to a user, such video signals may also or instead be stored and/or otherwise processed without necessarily being displayed.

Turning now to the receiving unit 400, in the example shown the receiving unit includes a network interface 404, a control subsystem 406, one or more video stream processors 408, one or more decompressors 410, a display canvas 412 and a background image 414 stored in a memory 415, and a canvas output 416.

The network interface 404 includes a physical port or connector, and may also include one or more other components to support communications through that port or connector and the network 402. The structure of the network interface 404 is dependent upon such characteristics as the type(s) of connection(s) over which communications are to be supported and/or the communication protocol(s) that are to be supported, for example.

The canvas output 416 is another example of a physical interface such as a port or connector, through which video signals are output from the receiving unit 400 to the display 418 in the example shown. For example, in an embodiment the canvas output 416 includes one or more video connectors, for coupling to the display 418 through a video cable or other connection. Other types of video interfaces and connections, such as the RX unit-user station interfaces and connections described by way of example elsewhere herein, are also possible. The present disclosure is not limited to any particular type of video interface.

The network interface 404 and the canvas output 416 are examples of interfaces that are provided in some embodiments to support communications between the example receiving unit 400 and other systems or components. Internal connections between components of the receiving unit 400 may be or include wired or wireless connections, and/or logical connections through commonly accessed memory locations for example.

The memory 415 includes one or more physical memory devices. Solid-state memory devices such as a Flash memory device, and/or memory devices with movable or even removable storage media, could be implemented. In an embodiment, the memory 415 is a dedicated memory device for storing video data, including a background image 414 and a display canvas 412 in the example shown. The memory 415 may also store content such as software and/or other data in some embodiments. Those skilled in the art will be familiar with various types of memory devices that may be provided at 415.

The other components of the example receiving unit 400, including the control subsystem 406, the video stream processor(s) 408, and the decompressor(s) 410, may be implemented using hardware, firmware, one or more components that execute software, or a combination thereof. Examples of such implementations are provided elsewhere herein. In some embodiments that involve one or more components executing software, one or more instances or engines for any one or more of the control subsystem 406, the video stream processor(s) 408, and the decompressor(s) 410 may be running or active at a time. Software for execution may be stored in the memory 415 or separately.

In operation, the receiver unit 400 communicates bidirectionally with the network 402 through the network interface 404. The receiving unit 400 may receive at least network command/control data and/or network video data and transmit at least requests for network video data in some embodiments, and accordingly a bidirectional connection is shown between the network 402 and the network interface 404. The network interface 404 also communicates bidirectionally with both the control subsystem 406 and the video stream processor(s) 408. For example, the network interface 404 may receive control signals from the control subsystem 406 and provide received control signaling to the control subsystem. In addition to providing at least received network video data to the video stream processor(s) 408, the network interface 404 may receive data from the video stream processor(s) 408 in some embodiments. The network interface 404 may receive at least network video data requests from the video stream processor(s) 410 and/or the control subsystem 404, to enable the receiving unit 400 to request network video data or segments from one or more video sources.

The control subsystem 406 also communicates with and controls the video stream processor(s) 408, and bidirectional communications between the video stream processor(s) and the decompressor(s) 410 is supported in the example shown. In an embodiment, the control subsystem 406 determines the type of processing that is to be applied to a received network video stream and instantiates and/or otherwise controls a video stream processor 408 to perform that processing. In some embodiments, received network video data is compressed, and a video stream processor 408 provides the compressed video signal to a decompressor 410 for decompression. The decompressor 410 decompresses the compressed network video data and returns decompressed video data to the video stream processor 408 for further handling or processing.

A video stream processor 408 at least sends video data to the display canvas 412, which also imports or otherwise receives the background image 414. The display canvas 412 formats a video output for display on the display 418 in the example shown, as described in further detail by way of example below.

Through the control subsystem 406 and one or more user input devices (not shown) for example, a user or operator may instruct the receiving unit 400 to display a video signal, from a specific video source, at a specific location on the video display screen of display 418. The control subsystem 406, and/or a video stream processor 408, may be configured to formulate a request specifying such parameters as the height, width, and one or more particular network video data segments, and to transmit the request through the network interface 404. The request may be transmitted to the video source or to a transmitting unit that is coupled to and handles requests for that video source.

In response to such a request, network video data from one or more video segments are received across the network 402 through the network interface 404, from the video source or transmitting unit to which the request was transmitted. A video signal or segment, or separate signaling, may include metadata or other information associated with the request and/or the video signal or segment. Examples of such metadata include any one or more of: an identifier of the request, the height and/or width of a segment, and compression state indicating whether the received video signal or segment has been compressed.

After a video signal or segment has been received, the control subsystem 406 routes the video signal or segment to a video stream processor 408. The video stream processor 408 that receives network video data or segment processes the network video data or segment, decompresses the video data or segment using a decompressor 410 if the received video data or segment was compressed, and writes the resulting processed video data or segment to the display canvas 412. Any of various types of processing may be applied to received video data or a segment by a video stream processor 408, and examples are provided elsewhere herein.

In some embodiments, there are multiple video stream processors 408 in a receiving unit 400, and any of a variety of configurations can be used.

For example, a video stream processor 408 may be allocated to each video source for which a video signal or segment is requested. All video signals or segments from a given resource may then be processed by the same video stream processor 408.

In another embodiment, a pool of video stream processors 408 is dynamically allocated to each video signal or segment as responses to requests are received by the receiving unit 400. This provides a more flexible architecture than a fixed video stream processor allocation. For example, a flexible architecture may be better suited to avoiding video stream processing constraints that may otherwise arise when processing multiple video segments from a single video source. Such video segments may be received by the receiving unit 400 substantially simultaneously or in short succession, in response to a request that includes a list of video segments for example. An allocated pool of video stream processors may be better able to handle processing of such video segments than a single video stream processor allocated to the video source from which the video segments were requested.

Various features disclosed herein may be subject to fixed or dynamic allocation. Fixed allocation may be part of initial configuration or hard-wired into structure, for example. Dynamic allocation may be a control feature that is enabled or supported by a control subsystem such as 406. These allocation options, and possibly others, may also or instead be applied to a transmitting unit.

One or more decompressor(s) 410 may be used to decompress compressed video signals or segments, as they are written into the display canvas 412, for example. In some embodiments, there are multiple decompressors 410 in a receiving unit, and any of a variety of possible configurations may be used.

In an embodiment, a decompressor 410 is allocated to each video stream processor 408. A video stream processor 408 may pass a video signal or segment to its specified decompressor 410 as each video signal or segment is received, and then receive the decompressed video signal or segment back from the decompressor following decompression.

In another possible embodiment, a pool of several decompressors 410 may be dynamically allocated to video stream processors 408 as needed. This type of allocation may provide a more flexible architecture that is better able to accommodate dynamic demand for decompression among the video stream processors 408.

The type of decompression applied by a decompressor 410 is dependent upon the type of compression that was applied to a video signal or segment. Any of various types of compression and decompression may be used, and the present disclosure is not limited to any particular type. Examples of compression techniques are provided elsewhere herein, and corresponding decompression techniques are illustrative of types of decompression that may be implemented using the decompressor(s) 410.

Following decompression and/or other processing, video data or a segment is sent to the display canvas 412. The display canvas 412 is a video memory that has been sized to cover, at least in part, a display area of the display 418. The size of the display canvas 412 may be specified during configuration of the receiving unit 400 for example.

Figure 4:
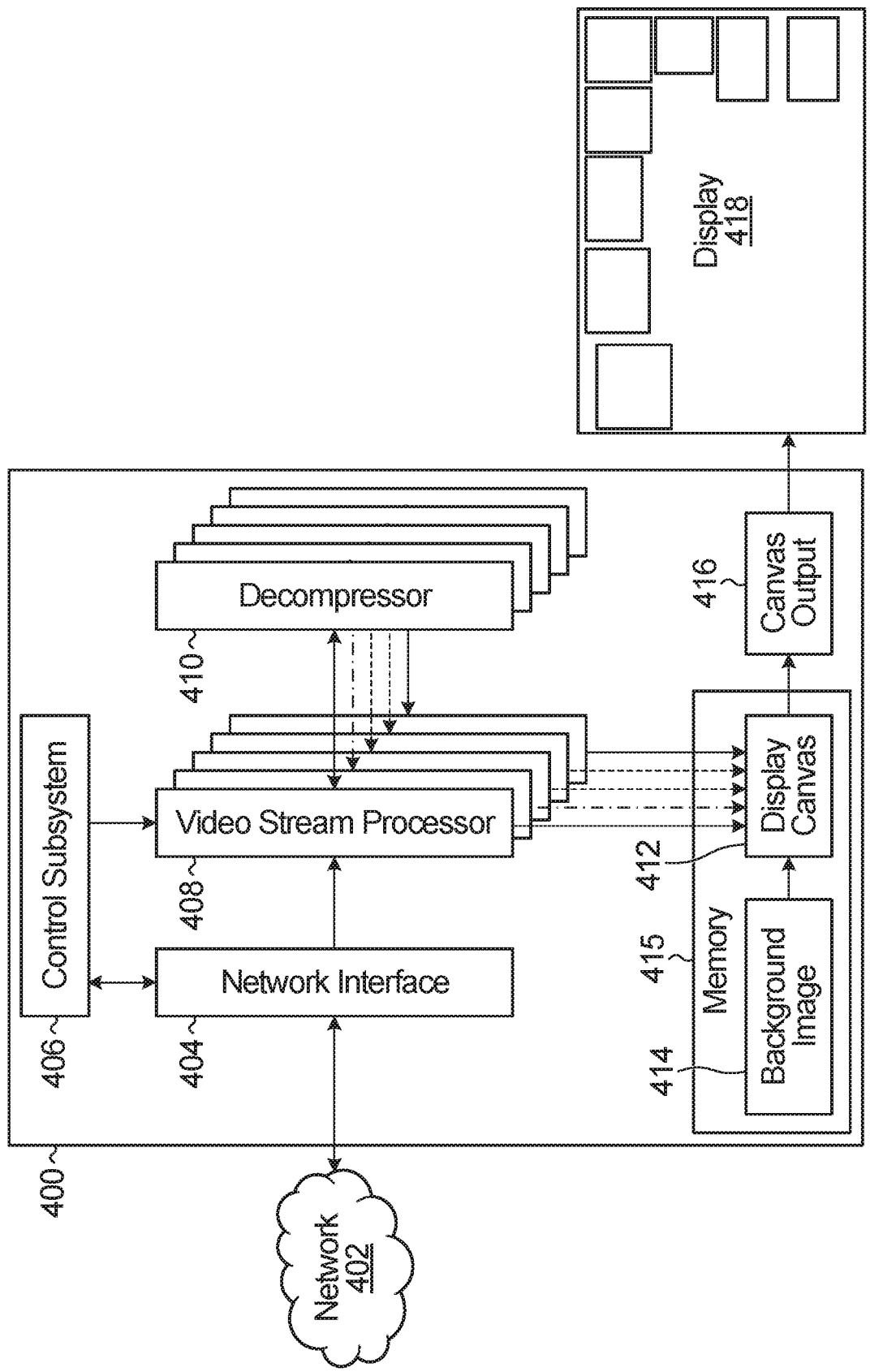
FIG. 4 is a block diagram of a receiving unit in accordance with an embodiment.
Figure 5A:
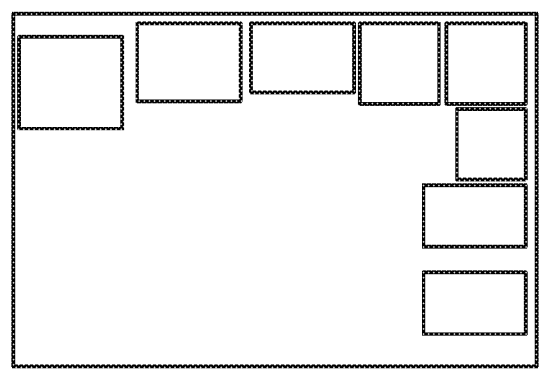
FIG. 5A is a block diagram illustration of the use of a display canvas formatted for a single display.

Although only a single display 418 is shown in FIG. 4, more generally a receiving unit may be coupled to one or more displays, and similarly a display canvas may be formatted for one display or multiple displays. FIG. 5A is a block diagram illustration of the use of a display canvas formatted for a single display. The largest block is intended to illustrate the display area that is covered by the display canvas, and the smaller blocks are intended to represent video signals that are displayed within the display area. As an example, for 1080p video, the display canvas has a size of 1920 pixels across (horizontally) by 1080 scans (vertically).

Figure 5B:
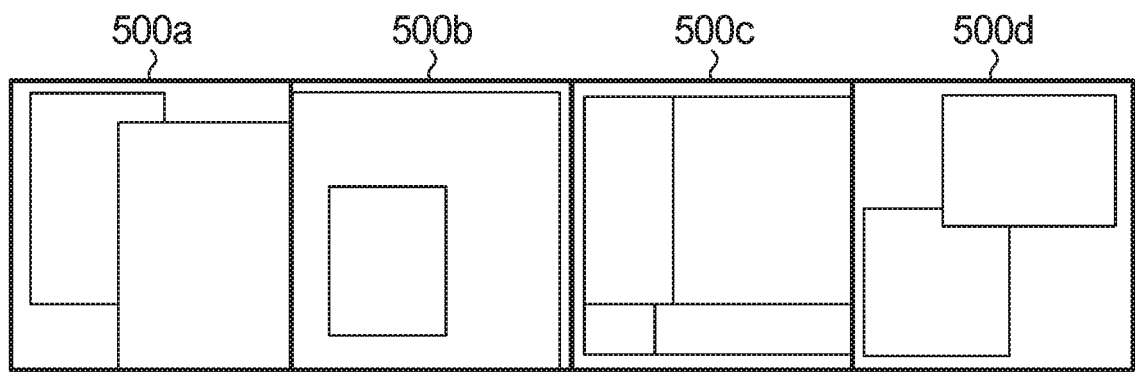
FIG. 5B is a block diagram illustration of the use of a display canvas formatted for a quad-head display.

A display canvas may instead be formatted for multi-head displays, such as dual-head displays including two side-by-side displays, triple-head displays including three side-by-side displays, or quad-head displays with four side-by-side displays. FIG. 5B is a block diagram illustration of the use of a display canvas formatted for a quad-head display. The display canvas in FIG. 5B covers display areas of four displays, and these display areas are labeled 500a, 500b, 500c, 500d in the drawing solely for illustrative purposes. The display canvas in FIG. 5B is a single display canvas covering four displays in some embodiments, and for a 1080p video format has a size of 7680 pixels horizontally (4 displays wide*1920 pixels per display) by 1080 scans vertically. The smaller blocks within each of the display areas 500a-d are intended to represent video signals that are displayed within the quad-head display area covered by the example display canvas.

Figure 5C:
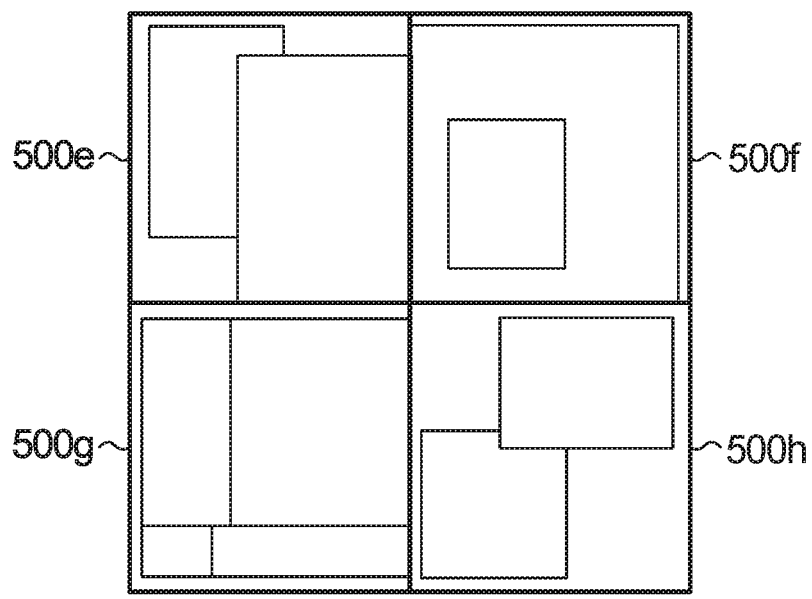
FIG. 5C is a block diagram illustration of the use of a display canvas formatted for a 2×2 videowall display.

In some embodiments, a display canvas is formatted for a "videowall" configuration. In one embodiment of a videowall configuration, monitors are stacked in a two-dimensional array and a display output is spread out across the monitors. FIG. 5C is a block diagram illustration of the use of a display canvas formatted for a 2×2 videowall display. The display canvas in FIG. 5C covers display areas of four displays, and these display areas are labeled 500e, 500f, 500g, 500h in the drawing solely for illustrative purposes. The display canvas in FIG. 5C is a single display canvas covering four displays in some embodiments, and for a 1080p video format has a size of 3840 pixels horizontally (2 displays wide*1920 pixels per display) by 2160 scans vertically (2 displays high*1080 scans per display). The smaller blocks within each of the display areas 500*e-h* are intended to represent video signals that are displayed within the 2×2 display area covered by the example display canvas.

Although not explicitly shown in FIGS. 5B and 5C, in multi-display embodiments one video signal may span the display area of more than one display. For example, even though all of the smaller blocks in these drawings are within one display area 500*a-h*, a video signal may be displayed across multiple displays.

The embodiments described with reference to FIGS. 5A-5C are not exhaustive, and any of various other configurations of displays and a display canvas are possible.

A transmitting unit, or one or more particular components or subsystems thereof, may be part of or otherwise coupled to a source of video such as a computer resource or other video source, and be configured to enable or support such features as receiving and processing requests for video signals or video segments. Such requests may be received from one or more receiving units, for example. A request may specify particular sizes and/or locations of video segments. Scaling and/or compression for requested video signals or segments may also or instead be provided. Requested video signals or segments may be transmitted to the requestor(s), such as one or more receiving units, that requested them.

These and other transmission-side or source-side features are described in further detail below, in part with reference to FIG. 6, which is a block diagram of a transmitting unit in accordance with an embodiment.

Figure 6:
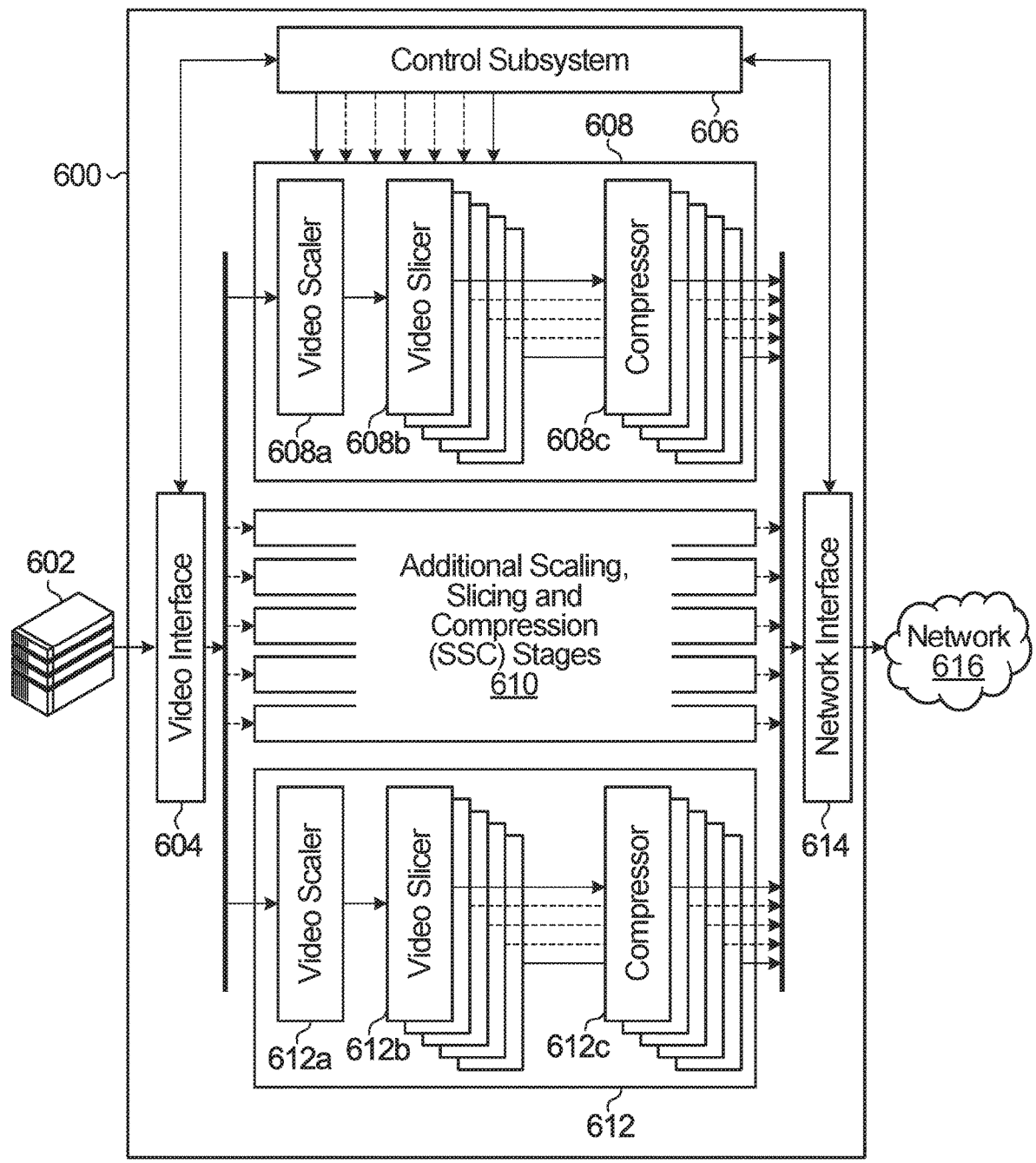
FIG. 6 is a block diagram of a transmitting unit, in accordance with an embodiment.

In addition to an example transmitting unit 600, FIG. 6 also includes a video source 602 and a network 616, with which the transmitting unit 600 operates in some embodiments. It should be appreciated, however, that a transmitting unit 600 need not itself include such components or subsystems as a video source 602 or a network 616, which are shown separately from the example transmitting unit in FIG. 6. It should also be noted that the transmitting unit 600 may be implemented inside a video source 602 in some embodiments.

A video source 602 may be or include any analog video source or digital video source. Computer resources and other types of video sources such as those referenced elsewhere herein are examples of a video source 602. Computer resources are shown and described by way of example at least with reference to FIGS. 2 and 3. Other examples of video sources include Blu-Ray Disc™ players, Digital Versatile Disk (DVD) players, security cameras, data tablets, and cell phones. Embodiments disclosed herein may be implemented in conjunction with these and/or other types of video sources.

The network 616 may be any type of network to enable the transmitting unit 600 to communicate with one or more remote components, such as one or more user stations and/or one or more receiving units. Wired and/or wireless communications may be supported.

Turning now to the transmitting unit 600, in the example shown the transmitting unit includes a video interface 604, a control subsystem 606, bandwidth reduction subsystems 608, 610, 612 and a network interface 614. More generally, a transmitting unit may include one or more bandwidth reduction subsystems. In the example shown, the bandwidth reduction subsystem 610 includes five sets of Scaling, Slicing and Compression (SSC) stages which are identical to 608, 612, yielding a total of seven SSC stages. In other embodiments, the number of bandwidth reduction subsystems 608, 610, 612 may be larger or smaller.

The video interface 604 is an example of a physical interface such as a port or connector, through which video signals are input to the transmitting unit 600 from the video source 602. For example, in an embodiment the video interface 604 includes one or more video connectors, for coupling to the video source 602 through a video cable or other connection. Other types of video interfaces and connections, such as the TX unit-computer resource interfaces and connections described by way of example elsewhere herein, are also possible. The present disclosure is not limited to any particular type of video interface.

The network interface 614 represents another communication interface and includes a physical port or connector. The network interface 614 may also include one or more other components to support communications through that port or connector and the network 616. The structure of the network interface 614 is dependent upon such characteristics as the type(s) of connection(s) over which communications are to be supported and/or the communication protocol(s) that are to be supported, for example.

The video interface 604 and the network interface 614 are examples of interfaces that are provided in some embodiments to support communications between the example transmitting unit 600 and other systems or components. Internal connections between components of the transmitting unit 600 may be or include physical connections such as wired or wireless connections, and/or logical connections through commonly accessed memory locations for example.

The control subsystem 606 and the bandwidth reduction subsystems 608, 610, 612 may be implemented using hardware, firmware, one or more components that execute software, or a combination thereof. Examples of such implementations are provided elsewhere herein. In some embodiments that involve one or more components executing software, one or more instances or engines for the control subsystem 606, one or more of the bandwidth reduction subsystems 608, 610, 612, and/or one or more components of any of the bandwidth reduction subsystems may be running or active at a time. Each bandwidth reduction subsystem 608, 610, 612 includes one or more video scalers such as 608*a*, 612*a*, one or more video slicers such as 608*b*, 612*b*, and one or more compressors such as 608*c*, 612*c*, and are therefore also referred to herein as Scaling, Slicing, and Compression (SSC) stages.

Software for execution to configure one or more processors and/or other component(s) to enable bandwidth reduction as disclosed herein may be stored in a memory (not shown). Such a memory may include one or more physical memory devices, examples of which are provided elsewhere herein. A memory in which software is stored may be a dedicated memory that only stores such software, or may also store video data, such as original video signals from the video source 602 and/or reduced-bandwidth versions of video signals that are generated by any one or more of the bandwidth reduction subsystems 608, 610, 612. Video data may instead be stored in one or more separate memories.

In operation, a video source 602 is used as an input to the transmitting unit 600 via the video interface 604. The video interface 604 also communicates bidirectionally with the control subsystem 606. For example, the video interface 604 may receive control signals from the control subsystem 606 to obtain video signals from the video source 602. The video interface 604 may also or instead provide received control signaling to the control subsystem 606 and/or provide to the control subsystem confirmations or other indications that requested video signals have been received from the video source 602.

The video interface 604 and the control subsystem 606 also communicate with the bandwidth reduction subsystems 608, 610, 612. In an embodiment, the control subsystem 606 determines, based on a request received through the network interface 614, the type of bandwidth reduction processing that is to be applied to a video signal that is received through the video interface 604, and instantiates and/or otherwise controls one or more of the bandwidth reduction subsystems 608, 610, 612 to perform that processing. For example, in the example shown the control subsystem 606 controls one or more of the bandwidth reduction subsystems 608, 610, 612 to instantiate or otherwise initiate processing of received video data by a video scaler such as 608a, 612a, a video slicer such as 608b, 612b, and/or a compressor such as 608c, 612c. Each of these components of a bandwidth reduction subsystem 608, 610, 612 performs its bandwidth reduction processing on a video signal that it receives from the video interface 604, under control of the control subsystem 606.

Although SSC stages are shown as examples of a bandwidth reduction subsystem, other bandwidth reduction systems that enable or support fewer, additional, and/or different types of bandwidth reduction are also possible. It should also be noted that any one or more of scaling, slicing, and compression may be applied to a received video signal in some embodiments.

Each of the bandwidth reduction subsystems 608, 610, 612 sends its output to the network interface 614, which communicates bidirectionally with the control subsystem 606 and the network 612. For example, the network interface 614 may communicate with the control subsystem 606 to provide to the control subsystem received requests for video signals or segments and/or confirmations or other indications of receipt of processed video signals from a bandwidth reduction subsystem 608, 610, 612. The control subsystem 606 may provide to the network interface 614 control signals and/or other information to control transmission of responses to requests for video signals or segments.

In some embodiments, a video signal that is received by the transmitting unit 600 through the video interface 604 is buffered and initially processed by the video interface. Initial processing by the video interface 604 may include, for example, processing associated with a communication protocol between the video source 602 and the video interface 604 and/or analog to digital conversion of received analog video signals. Other types of processing may also or instead be performed by the video interface 604.

In some embodiments, when a request for a video signal or one or more video segments of a video signal is received, the control subsystem 606 allocates one or more of the bandwidth reduction subsystems 608, 610, 612 to the request. Multiple requests may be received, and therefore multiple bandwidth reduction subsystems 608, 610, 612 may be allocated to service those requests, for example. A video signal that is received through the video interface 604 is routed to the allocated bandwidth reduction subsystem(s) 608, 610, 612 by the video interface 604, and in the case of multiple allocated bandwidth reduction subsystems, a received video signal may be routed to all of the allocated bandwidth reduction subsystems in parallel.

A video scaler such as 608a, 612a that receives a video signal scales the video signal or a portion of the video signal based on scaling information such as a specified size and region of interest that is provided within the request. A video signal that is not to be scaled may be passed through by a video scaler such as 608a, 612a without applying scaling. In another embodiment, a video scaler is not instantiated or otherwise not used if scaling is not to be applied to a video signal.

The scaled video signal from a video scaler such as 608a, 612a may, but need not necessarily, be further processed to reduce transmission bandwidth. If a request for a video signal specified only scaling for the requested video signal, then the scaled video signal may be sent to the network interface 614 for transmission to the requestor in response to the request. In some embodiments, a scaled video signal that is not to be further processed for bandwidth reduction is sent through a video slicer such as 608b, 612b and a compressor such as 608c, 612c, and the video slicer and compressor are controlled by the control subsystem 606 to not apply slicing or compression to the scaled video signal. In another embodiment, a video slicer and a compressor are not instantiated or otherwise not used if only scaling is to be applied to a video signal.

Slicing is another example of bandwidth reduction processing that may be applied to video signals in the example shown in FIG. 6. Although it is expected that at least some scaling will be applied to video signals in many implementations, slicing a video signal into one or more segments is not in any way dependent upon first scaling a video signal. In some embodiments, a video signal that is not to be scaled is sent directly to a video slicer such as 608b, 612b by the video interface 604. In other embodiments, a video signal that is to be sliced but is not to be scaled is routed to a video slicer such as 608b, 612b through a video scaler such as 608a, 612a, and the video scaler is controlled by the control subsystem 606 to not apply scaling to the video signal. In yet another embodiment, a video scaler is not instantiated or otherwise not used if scaling is not to be applied to a video signal.

Slicing refers to breaking a video signal up into a requested number of video segments in accordance with one or more parameters such as segment size, as specified in a request. In some embodiments, there are multiple video slicers such as 608b, 612b in a bandwidth reduction subsystem, and a video signal, which may or may not have been scaled, is sent to one or more of those video slicers. Any of a variety of video slicer configurations are possible.

In one embodiment, a fixed number of video slicers are allocated to each SSC stage, and the video slicers allocated to each SSC stage execute all video segmentation or slicing for that SSC stage. Consider, for example, an embodiment in which SSC stages are scaling-specific, and each SSC stage has a respective associated video scaling size. In such an embodiment, the video slicers that are allocated to each SSC stage execute video segmentation or slicing for a given video scaling size associated with the SSC stage to which the video slicers are allocated.

In another embodiment, a dynamic number of video slicers may be available for use in all SSC stages, and one or more video slicers are allocated to each SSC stage as needed. This can provide a more flexible architecture relative to a fixed-allocation architecture. For example, one video scaling size might not need any slicing, whereas another video scaling size may need to perform complex slicing to generate the requested number of video segments. Available video slicing resources can be dynamically allocated to meet different slicing requirements or demand between different SSC stages.

The video segment from a video slicer such as 608b, 612b may, but need not necessarily, be further processed to reduce transmission bandwidth by compression in the example shown in FIG. 6. If a request for a video signal segment specified only slicing for the requested video segment, then the requested video segment may be sent to the network interface 614 for transmission to the requestor in response to the request. In some embodiments, a video segment that is not to be further processed for bandwidth reduction is sent through a compressor such as 608c, 612c, and the compressor is controlled by the control subsystem 606 to not apply compression to the video segment. In another embodiment, a compressor is not instantiated or otherwise not used if compression is not to be applied to a video signal.

Video signals that are to be compressed may be original video signals received through the video interface 604, scaled video signals that are generated using one or more video scalers such as 608a, 612a, and/or video segments that are generated using one or more video slicers such as 608b, 612b. Compression of a video signal is not in any way dependent upon first scaling or slicing a video signal. In some embodiments, a video signal that is not to be scaled or sliced but is to be compressed is sent directly to a compressor such as 608c, 612c by the video interface 604. In other embodiments, a video signal that is not to be scaled or sliced is routed to a compressor such as 608c, 612c through a video scaler such as 608a, 612a and a video slicer such as 608b, 612b, and either or both of the video scaler and the video slicer is controlled by the control subsystem 606 to not apply scaling or slicing to the video signal. In yet another embodiment, a video scaler and/or a video slicer is not instantiated or otherwise not used if only compression is to be applied to a video signal or compression is to be applied in combination with only one of scaling and slicing.

Video signals or segments may be compressed using one or several compressors such as 608c, 612c. Any of several compressor configurations may be used.

In one embodiment, a compressor such as 608c, 612c may be allocated for each video slicer such as 608b, 612b, in which case all compression required by any video slicer is performed by the allocated compressor. Scaler-specific allocation of compressors such as 608c, 612c is also possible.

In another embodiment, a dynamic number of compressors may be available for use in all SSC stages and are allocated to each SSC stage or video slicer such as 608b, 612b as needed. This can provide a more flexible architecture relative to a fixed-allocation architecture. For example, one video slicer or segment might not need any compression, whereas another video slicer or segment requires compression. Available compression resources can be dynamically allocated to meet different compression requirements or demand between different SSC stages.

Compression is lossless in some embodiments, and lossless compression may generally be preferred for video signals or segments. One or more, possibly lossless, compression algorithms or techniques may be applied. Examples include, but are not limited to, Lempel-Ziv 77 (LZ77) or Deflate compression, Run Length Encoding (RLE) compression, and any of various combinations of these and/or other types of compression. Due to the well-known "pigeonhole principle" as it relates to compression, it may be advantageous to utilize a variety of compression algorithms, based on one or more parameters of the video signal or segment that is to be compressed, for example. The control subsystem 606 or another component of the example transmitting unit 600 may select and use one or more compression algorithms based on a received video signal and/or any particular segment(s) thereof that are to be compressed.

In one embodiment, each compressor such as 608c, 612c implements or supports a single type of compression, also referred to as a compression block, and applies that compression block to all video signals or segments that it compresses, regardless of compression efficiency.

In another embodiment, a compression engine such as 608c, 612c may implement or support two or more compression algorithms. A compression analyzer, within each compressor, within each SSC stage, or within the control subsystem 606 for example, may be configured to analyze video data such as one or more scans of a video signal or segment that is to be compressed, to determine and select the supported compression block(s) that would be most efficient or otherwise more suitable for the video signal or segment.

Multiple compression blocks may be provided for each of one or more types of compression, and those compression blocks may be dynamically allocated based on compression demand and/or analysis of video data by a compression analyzer, for example. This may provide for a more flexible architecture than a fixed-allocation architecture, by enabling fewer compression blocks to be implemented but spread or shared across several SSC stages.

Video data analysis during or just before compression is one possible option for selection of compression type(s). In another embodiment, video scalers such as 608a, 612a and/or video slicers such as 608ab, 612b may generate real-time data to also or instead be used in compression type selection and/or to increase the speed and efficiency of a compression analyzer.

Following the processing to reduce transmission bandwidth, which may include any one or more of scaling, slicing, and compression in the example SSC stages shown in FIG. 6, one or more reduced-bandwidth versions of one or more video signals from the video source 602 are transferred to the network interface 614 for transmission to targets, through receiver units that initially requested the video signal(s) or segments thereof, for example.

FIGS. 4 and 6 illustrate embodiments of a receiving unit and a transmitting unit that may be implemented in some embodiments to reduce bandwidth associated with transmitting video signals. Referring again to FIG. 1, according to an example above it was determined that delivery of eight video streams requires 3.732 gigabits/second bandwidth per stream, for a total of 29.856 gigabits/second of bandwidth. In a receiving unit-transmitting unit embodiment, the required bandwidth can be reduced using eight transmitter units, including one for each of the eight video sources, and a receiver unit to request and process the video signals or segments for output in the example video display 100.

In the same example 1080p configuration, suppose that an SSC stage in a transmitting unit scales the images associated with one of the video sources to 352 pixels by 198 scans. With 3 bytes per pixel, 1 scan includes 1056 bytes (352 pixels*3 bytes per pixel), and 1 frame includes 209,088 bytes (1056 bytes*198 scans). At a frame rate of 60 frames per second, a pre-scaled video stream includes 12,545,280 bytes (1 frame*60 frames per second), and bandwidth for transmission of such a pre-scaled video stream is approximately 0.125 gigabits/second (pre-scaled video stream byte count*10). This bandwidth reduction to approximately 0.125 gigabits/second represents a reduction of bandwidth by a factor of more than 29 ([3.732 gigabits/second]/[0.125 gigabits/second]=29.748).

The total required bandwidth for eight pre-scaled 1920× 1080p video streams, based on the same scaling to 352 pixels by 198 scans by each of eight transmitting units for example, would be approximately 1 gigabit/second (8*bandwidth for pre-scaled video stream), compared to approximately 29.856 gigabits/second for full-bandwidth video and 8 video streams.

From this example, it is evident that even just video source-side pre-scaling as disclosed herein can substantially reduce the bandwidth required to transport video streams, from multiple transmitting units to a single receiving unit for example. The examples above illustrate a reduction in bandwidth of approximately 96.7% by pre-scaling video streams before transmission. In both examples, only approximately 3.3% of the bandwidth required for full-bandwidth video is required for transmission of pre-scaled video signals.

Compression may also or instead be used to reduce or further reduce the bandwidth required to transmit video signals for eventual output, such as display, on an output device. Although it can be difficult to quantify the full benefits of compression on video imagery, due to its dynamic content that changes sixty or more times each second, it may be useful to consider an example to illustrate the potential benefits of compression.

The highest level of compression in a 1920 pixel scan, for example, would be a scenario in which there is uniformity of pixels across the scan, or in other words each pixel on the scan is the same. In this example, only one pixel and a count of how many subsequent pixels are the same (1919 in this example) may be transmitted. This is the basis of RLE compression, for example. In this best-case scenario, a 3-byte pixel size, and RLE compression, the compressed scan size is only five bytes, including 3 bytes for the single pixel and two additional bytes for the count of pixels that are the same. This compares to an uncompressed scan size of 5760 bytes (1920 pixels*3 bytes), resulting in a best-case compression factor of approximately 99.913%. Conversely, the worst-case scenario would comprise no repeatable patterns among pixels within a scan and consequently a compression factor of 0%.

In S. Mittal and J. Vetter, "A Survey Of Architectural Approaches for Data Compression in Cache and Main Memory Systems", published in the IEEE Transactions on Parallel and Distributed Systems on May 20, 2015, the authors indicated that most lossless compressions can achieve an average compression rate of about 2, and possibly as high as 4. For illustrative purposes, consider the more conservative value of a compression rate of two. Based on the scaling example above, this yields a compressed scan of a size of 528 bytes (1056 bytes/2), a frame of size 104,544 bytes (528 bytes*198 scans), and a scaled and compressed video stream of size 6,272,640 bytes (1 frame*60 frames per second). The resultant bandwidth requirement for a single stream is only approximately 0.063 gigabits/second (6,272,640 bytes*10), and a reduction in bandwidth of approximately 50% compared to the bandwidth determined above for pre-scaling without compression. For eight streams, the bandwidth requirement is approximately 0.5 gigabits/second (0.063 gigabits/second per stream*8) to transmit eight pre-scaled and compressed 1920×1080p video streams from eight transmitting units.

Figure 7A:
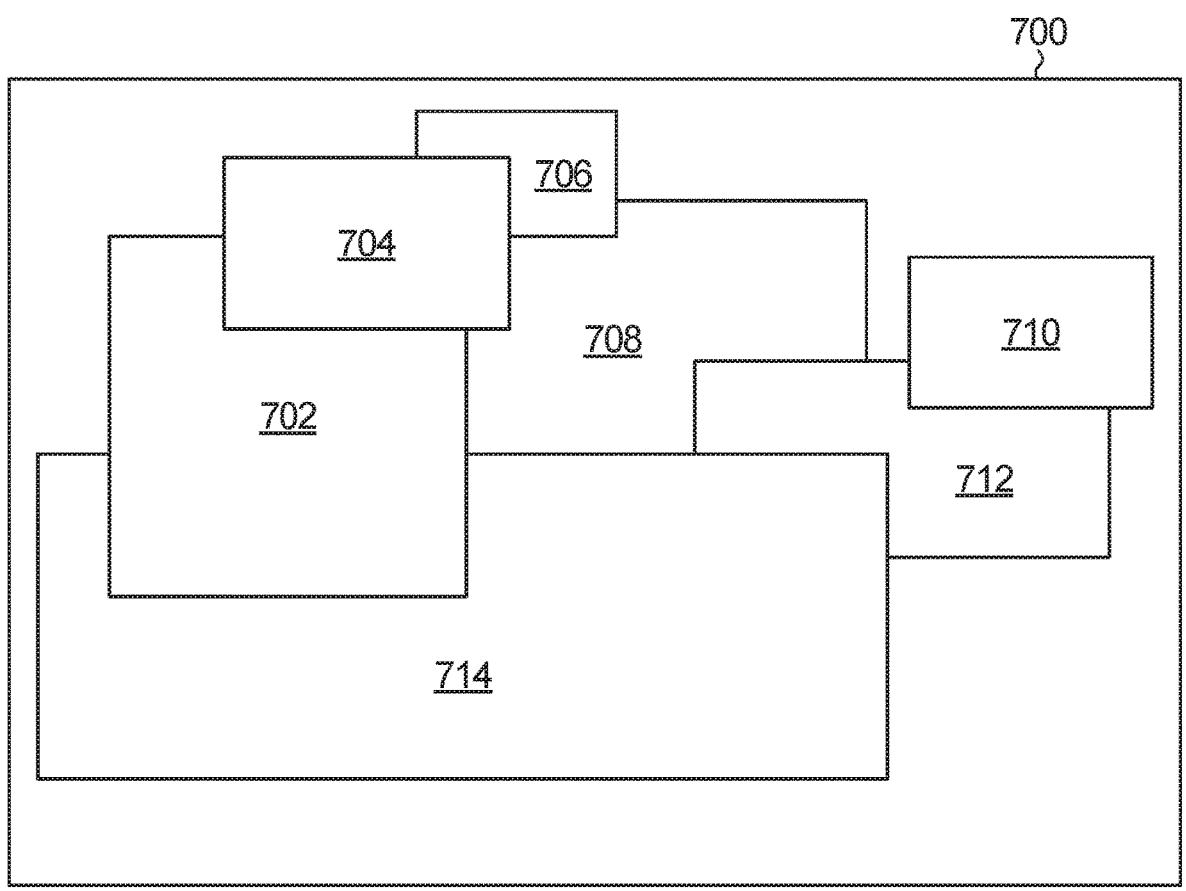
FIG. 7A is a block diagram illustration of another example video display screen with representations of multiple video signals.

One possible application of video slicing is in embodiments in which video signal representations in a video display screen overlap. Video slicing may be used to request only video segments that are actually visible in a video display screen with a plurality of video sources. This is described by way of example with references to FIGS. 7A to 7H. FIG. 7A is a block diagram illustration of an example video display screen 700 with representations of multiple video signals, and FIGS. 7B to 7H are block diagram illustrations of video segments associated with parts of the example video display screen 700 in FIG. 7A.

In FIG. 7A, representations of seven different video signals are overlaid on top of each other and scaled to a variety of different sizes, as shown at 702, 704, 706, 708, 710, 712, 714. In an embodiment, SSC stages in a transmitting unit that is coupled to each video source associated with each video signal is used in conjunction with a single receiving unit, which sends video segment requests for only the visible portions of each video signal that is currently being displayed. When the requested video segments are received by a receiving unit in response to the requests, the video segments are reassembled and positioned to generate the desired final video display screen, in a display canvas in some embodiments. These features enable reduction, or further reduction, of required bandwidth for transmission of video signals.

Figure 7B:
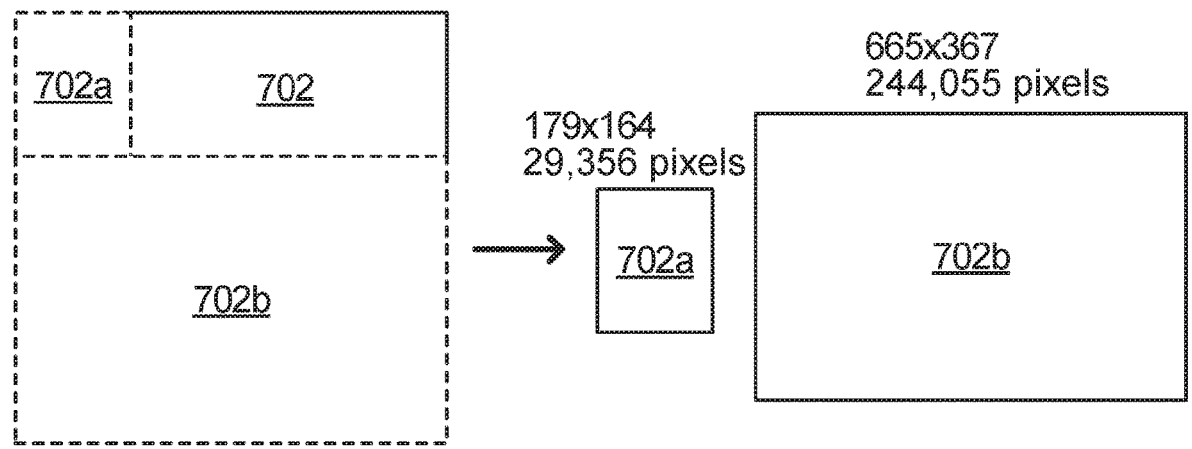

Consider FIG. 7B, in which video segments 702a, 702b are not occluded by video signal that is displayed at 704 in FIG. 7A and are requested from the video source of the video signal that is displayed at 702. The example number and sizes of the video signal segments in FIG. 7A, and similarly in other drawings, are solely for illustrative purposes. The present disclosure is not limited to any number of video segments or sizes of such segments. The examples shown are based on each video source generating a complete 1920×1080 video stream, with pre-scaling applied.

Figure 7C:
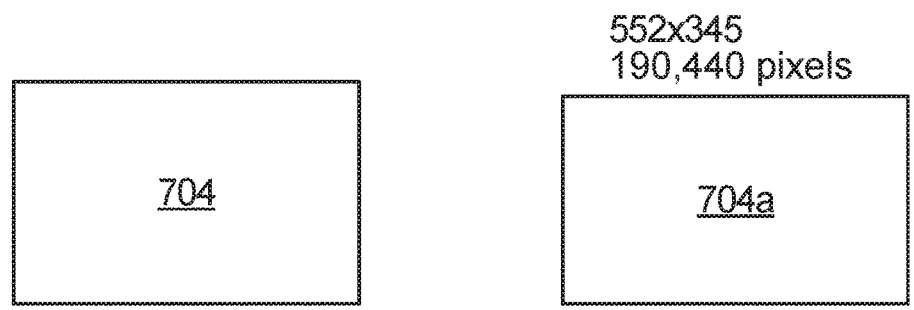

As shown in FIG. 7C, the video signal displayed at 704 is entirely visible, and therefore a segment 704a that includes the full video or signal is requested from the video source of that video signal. In another embodiment, a request for a full video signal does not specify any particular segment size.

Figure 7D:
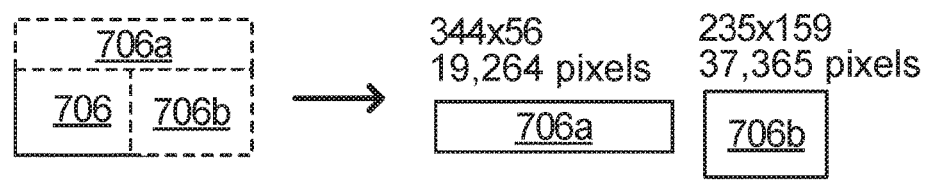
Figure 7E:
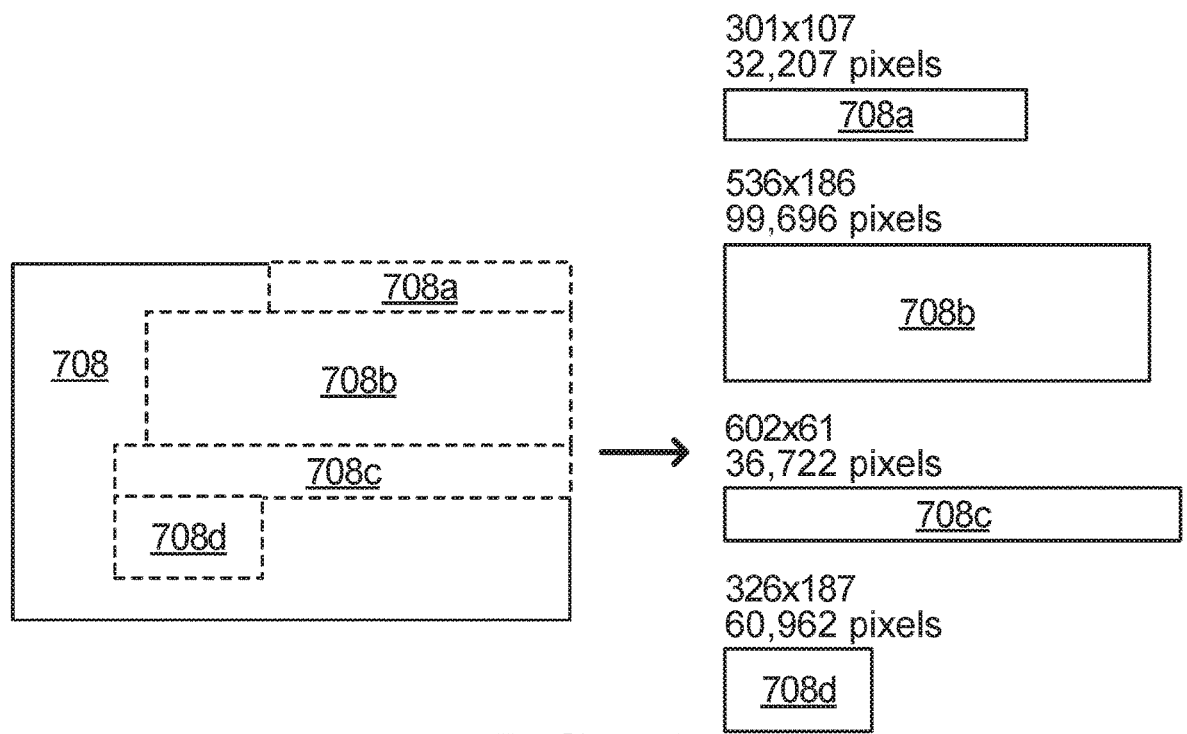
Figure 7F:
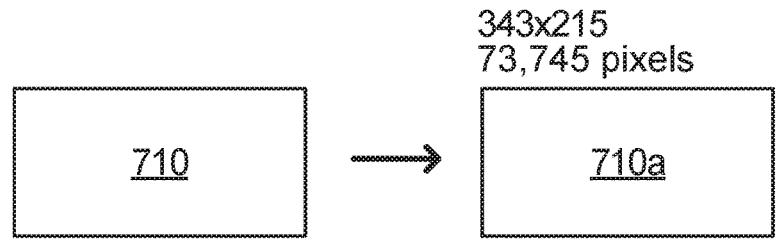
Figure 7G:
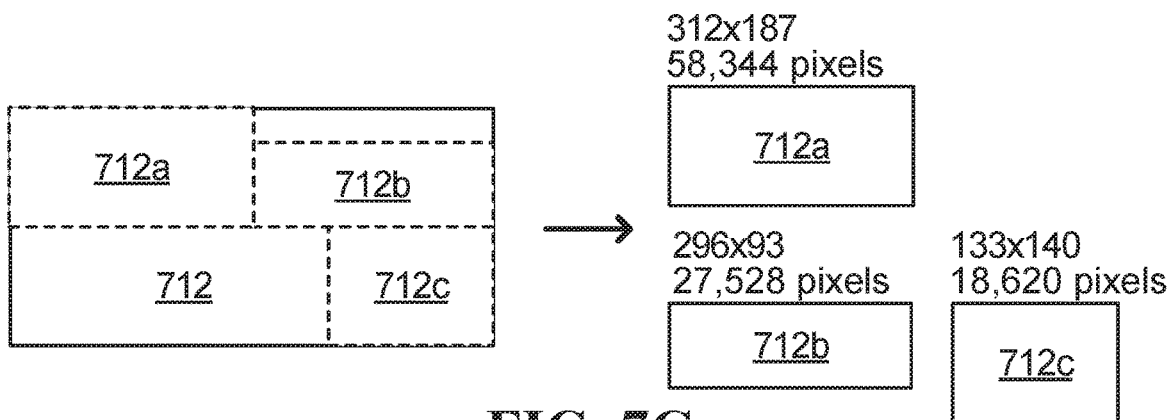

FIG. 7D illustrates video segments 706a, 706b for the video signal displayed at 706, FIG. 7E illustrates video segments 708a, 708b, 708c, 708d for the video signal displayed at 708, FIG. 7F illustrates a single video segment 710a for the video signal displayed at 710, FIG. 7G illustrates video segments 712a, 712b, 712c for the video signal displayed at 712, and FIG. 7H illustrates video segments 714a, 714b, 714c for the video signal displayed at 714.

Based on the example video segments shown in FIGS. 7B to 7H, the following calculations can be made for per-segment pixel counts and total pixel count per frame, with system numbers referring to video sources of the video signal representations in FIG. 7A and segment numbers referring to video segments illustrated in FIGS. 7B to 7H:

pixel count 29,356, for system #1 (source of 702), segment #1 (702a)
pixel count 244,055, for system #1, segment #2 (702b)
pixel count 190,440, for system #2 (source of 704), segment #1 (704a)
pixel count 19,264, for system #3 (source of 706), segment #1 (706a)
pixel count 37,365, for system #3, segment #2 (706b)
pixel count 32,207, for system #4 (source of 708), segment #1 (708a)
pixel count 99,696, for system #4, segment #2 (708b)
pixel count 36,722, for system #4, segment #3 (708c)
pixel count 60,962, for system #4, segment #4 (708d)
pixel count 73,745, for system #5 (source of 710, segment #1 (710a)
pixel count 58,344, for system #6 (source of 712), segment #1 (712a)
pixel count 27,528, for system #6, segment #2 (712b)
pixel count 18,620, for system #6, segment #3 (712c)
pixel count 8,330, for system #7 (source of 714), segment #1 (714a)

pixel count 94,518, for system #7, segment #2 (714b)
pixel count 554,496, for system #7, segment #3 (714c)
total pixel count per frame: 1,585,648.

For 3-byte pixels, the number of bytes in a frame is 4,756,944 bytes (total pixel count per frame*3), and at a rate of 60 frames per second the data rate is 285,416,640 bytes/second (4,756,944 bytes per frame*60), or a bandwidth requirement of approximately 2.854 gigabits/second. This compares to a bandwidth of 26.124 gigabits per second for full-bandwidth transmission at 3.732 gigabits/second for seven video streams. In this example, bandwidth savings due to pre-scaling and slicing are approximately 89.1%.

The foregoing examples are intended only for illustrative purposes. Other embodiments may slice video signals in different ways, for example. Consider FIG. 7G, in which the video segments 712a, 712b are sliced "vertically" across scans, whereas other video segments are sliced "horizontally" relative to each other. Either or both of these slicing examples, and/or potentially others, may be used in embodiments.

Features disclosed herein, such as video signal slicing, may be implemented in any of various ways. In one embodiment, and for illustrative purposes only, consider a scenario in which one RX unit 305a-b (FIG. 3) interfaces with any or all of the TX units 308a-c. Interactions between the RX unit 305a-b and the TX unit(s) 308a-c in this example scenario may involve operations or steps similar to the following. In this illustrative example, each of the RX units 305a-b is configured with a unique identifier (ID).

Suppose that an RX unit 305a-b determines that the display of video signals at its user station 306a-b has changed. For example, a user may rearrange, resize, add, and/or delete one or more video sources, signals, or segments. Responsive to detecting the change, the RX unit 305a-b sends a command to each of the TX units 308a-c from which it is receiving video signals or segments, to cause the TX unit(s) to stop sending video signals or segments to the RX unit. This command includes the unique ID of the RX unit 305a-b.

In response to the command, each TX unit 308a-c that is currently sending video signals or segments to the RX unit 305a-b with the specified unique ID stops sending video signals or segments to that RX unit 305a-b, but may continue to send any requested video signals or segments to other RX units.

In a video slicing embodiment, the RX unit 305a-b that detected the change performs a "Z ordering" sort of the new display layout for its user station, and this sort in turn determines a depth ordering of the TX unit 308a-c video sources, in this case the computer resources 309a-c, from which video signals are to be displayed based on the new layout. The TX unit 308a-c associated with the computer resource 309a-c that is on top of the "stack" in the Z ordering is assigned a highest number based on the sort, the TX unit 308a-c associated with the computer resource 309a-c that is on the bottom of the stack is assigned a lowest number based on the sort, and all other TX units 308a-c are assigned numbers between the highest and lowest numbers according to their location in the stack. Those skilled in the art will be familiar with this type of Z ordering.

The RX unit 305a-b then scans each pixel in its user station display, and also determines the Z order value and TX unit 308a-c that is associated with each pixel. This enables grouping of pixels of the same Z order and the same TX unit together to form rows, and subsequent grouping rows of the same Z order and the same TX unit together to form video segments. When this operation is complete, all of the video segments would have been identified and placed in a list, along with an identifier or other indicator of the TX unit 308a-c with which each segment is associated.

In a list-based embodiment, the RX unit 305a-b that detected the change now steps through the list, sending a command to the corresponding TX unit 308a-c for each video segment found in the list. Commands may, but need not necessarily be sent according to the order of video segments in the list. Video segments may be requested, and/or received, from TX units 308a-c in any order.

The command for a video segment includes the unique ID of the RX unit 305a-b; the scaled display size of the video signal of which the video segment is a part; the position, such as an X,Y position, of the video segment in the display of the computer resource 309a-c associated with the TX unit 308a-c corresponding to the video segment; the width and height of the video segment, in pixels for example; and one or more flags indicating such compression parameters as whether the video segment should be compressed, and/or a type of compression.

At this point, it may be useful to consider a particular scenario, to further illustrate the present example. Suppose that a user clicks on and moves a window, in which a video signal from a particular video source is displayed, across a user station display screen. As the window is moved, it will naturally obscure portions of other windows below it, and/or reveal portions of other windows that are no longer below it. In a slicing embodiment, a new set of one or more segments is requested from at least each video source that is associated with an affected window.

Even if a user does not move a display window, as the user clicks on a display window that is at least partially obscured by other display windows and is therefore being sliced, the display window on which the user has clicked is brought to the top of the stack and will now be seen in its entirety. The video signal associated with that display window may still be scaled and compressed, but now no longer needs to be sliced. However, in moving this display window to the top of the stack, one or more other display windows associated with some or all other video sources may be affected. For example, one or more other display windows may be entirely obscured, and therefore the above-referenced "stop" command(s), sent by the RX unit to cause the TX unit(s) for the video source(s) associated with the fully obscured display windows to stop sending a video signal or segment, results in bandwidth savings because video signals that are not visible to the user are no longer being transmitted to the RX unit.

Similarly, other display windows may be partially obscured by the newly selected display window. The stop command(s) from the RX unit to the TX unit(s) of video sources that are associated with affected display windows cause each TX unit to stop sending its current video signal or segment(s), and a new set of one or more segments is requested if a display window associated with a video source is still at least partially visible in the user's display screen.

In the example above, stop commands and requests for new segment sets are sent to all TX units from which the RX unit is receiving video signals or segments. The new segment set associated with a particular video source may, but need not necessarily, be different from a previous set for that video source, but a requested segment set for each video source is always based on what is visible to the user in this example.

Each TX unit 308a-c, responsive to receiving a command from the RX unit 305a-b, allocates one or more SSC stages to service the command and generate the requested segment.

After allocation of the SSC stage(s) the TX unit 308a-c transmits the requested video segment(s) for delivery to the uniquely identified RX unit 305a-b target using the unique ID of the RX unit in this example.

As the RX unit 305a-b begins receiving the requested video segments, it again utilizes its segment list to aid in processing of the arriving segments. Because a video source transmits a number of frames-per-second to provide a live, moving image, video segments may be transmitted over and over again. For home television signals for example, that can be as much as 60 times per second.

In the case of live video, there may be a natural time gap from the end of one video frame to the beginning of a next video frame. In an embodiment, an RX unit 305a-b determines the beginning of a new video frame when a time interval between segment reception from a TX unit 308a-c exceeds a specified value. In another embodiment, a "Start-Of-Frame" indicator is sent by a TX unit 308a-c to an RX unit 305a-b to indicate the beginning of a new video frame.

Any of several options may be used to order received video segments. In one embodiment, a TX unit 308a-c is configured to transmit all video segments to an RX unit 305a-b in the same order in which those video segments were requested, and the RX unit is configured to determine correct segment order based on request order, from the segment list for example. In another embodiment, an indicator such as a "Segment ID", prefixed at the beginning of each segment by a TX unit 308a-c for example, identifies a video segment that is being transmitted, and an RX unit 305a-b is configured to distinguish between different received video segments based on the indicator.

If a video segment was requested in compressed form, then the RX unit 305x unit would decompress the video segment as part of its processing, before adding the segment to the canvas output 416 (FIG. 4) for display for example. Received video segments that were not compressed are not subject to decompression processing. An RX unit 305a-b may determine compressed/uncompressed state of a received video segment based on its request to a TX unit 308a-c for that video segment. A compression state indicator, for example, could be included in the segment list. In another embodiment, a TX unit 308a-c is configured to include a compression state indicator such as a "Compression ID" with a video segment, prefixed at the beginning of each video segment, for example, to alert an RX unit 305a-b to the type of compression that was used for the video segment. The receiving RX unit 305a-b is then able to determine compression state based on the indicator. In some embodiments, an explicit indicator is used to indicate that no compression has been applied to a video segment, or the absence of any compression state indicator implicitly indicates no compression.

If any video segments that are received by the RX unit 305a-b were not actually requested, then they may be rejected, discarded, or ignored.

The steps above are an example of one embodiment, and there are a variety of embodiments that could be employed. For example, in the embodiment above, the RX unit 305a-b sends "stop" commands to all TX units 308a-c from which it is currently receiving video signals or segments. In another embodiment, an RX unit 305a-b that detects a change may determine that many of the video segments being delivered do not need to change, and therefore the command to "stop" and the subsequent commands to begin re-sending video segments could be avoided for non-changing video segments and associated TX units 308a-c.

Change detection may also or instead be supported at a video source or TX unit. Although an RX unit 305a-b may request a video segment, in some embodiments a TX unit 308a-c or a video source such as a computer resource 309a-c is configured to determine whether the actual video data in one or more video segments has changed from the previous video frame to the current video frame. If there has been no change, then additional and potentially significant bandwidth reduction could be achieved. As an example, consider a movie that ends with a camera panning up to view a panoramic landscape and then just remaining on the landscape and staying motionless for several seconds. If nothing in a scene is changing, then video data associated with that scene need not be sent. A "Segment ID" or other indicator of a video segment could be useful in enabling this type of change-based bandwidth reduction. For example, in an embodiment, an RX unit 305a-b is configured to re-use and continue to display an old video segment in the event that it does not receive a particular video segment, identified by a Segment ID or other indicator, for a current frame. In another embodiment, a "Reuse-Existing-Segment" indicator or other indicator that an old video segment is to be re-used could explicitly be sent to an RX unit 305a-b to instruct it to re-use one or more existing video segments.

In the embodiment above, a command to send a video segment is sent for each video segment in the list, potentially resulting in multiple per-segment commands being sent to a single TX unit 308a-c. In other embodiments, a single command to begin sending one or more video segments could be sent to each TX unit 308a-c. A multi-segment command may include a list of all video segments that are to be sent by a TX unit 308a-c to the requesting RX unit 305a-b, for example.

A "Z ordering" method is used in the embodiment above to determine the location and size of each video segment. Other embodiments could utilize different methods to determine the video segment sizes and/or locations. Those skilled in the art will be familiar with several methods that could be employed.

Assignment of numbers to TX units or video signals or segments based on sort order is also an example. The highest and lowest designations in the example above could be reversed, for example, such that higher numbers indicate or signify video signals that are deeper or at lower display layers or levels. Video signal depth in a video display may even be tracked in any of various other ways that may or may not necessarily involve explicitly assigning numbers.

Determination of video segments in the embodiment above involves scanning pixels by row and grouping rows of pixels together. Other scan patterns, including but not limited to scanning pixels by column and subsequent grouping of columns of pixels together, are possible.

List-based tracking of video segments and corresponding TX units is an example as well. Video segments and TX units may be tracked in records or structures that are not necessarily lists.

The various commands in the embodiment above are also examples of signaling that may be exchanged between targets and video sources. In the above embodiment, the commands are examples of "stop" requests to stop transfer of video signals or segments from one or more video sources and "start" requests to obtain video segments from one or more video sources. More generally, signaling to cause a transmitting unit to stop sending video signals or segments and/or signaling to cause a transmitting unit to start sending video signals or segments may be transmitted from a target-side, by a receiving unit for example, and received at a source-side, by a transmitting unit for example. Such signaling may include commands as in the embodiment above, but in other embodiments the signaling includes some other form of indication as to the function(s) or operation(s) that are to be performed.

Signaling parameters or fields such as the command contents described by way of example above may be specified in any of various ways.

An RX unit unique ID, for example, may include letters, numbers, and/or other characters or symbols in a combination that is unique to that RX unit.

Scaled display size of a video signal at a target RX unit user station may be specified or indicated as one or more numbers that provide an area, perimeter, width and height, scaling ratio and/or other measure of absolute or relative size of a scaled video signal. Similarly, although width and height of a video segment in pixels is described above as an example for indicating video segment size in a command, video segment size may be indicated in other ways.

For video segment position within the original video source display screen, an X,Y position is provided above as an example. This may be a start position, an end position, a center position, or some other position associated with a video segment, from which the extent of the video segment can be determined. With a video segment position and size, for example, a transmitting unit can identify the part of a video signal that forms a video segment. The present disclosure is not limited only to X,Y position. Other forms of indexing or referencing may also or instead be used to indicate position.

Finally, regarding the example of one or more flags indicating such compression parameters as whether the video segment should be compressed and/or a type of compression, flags need not necessarily be used. A "compression" field in signaling from a target, for example, may be left blank if no compression is to be applied, or populated with an indication of a compression algorithm if a requested video signal or segment is to be compressed. Other options are also possible.

It should also be noted that signaling to request a video signal or segment may include additional, fewer, and/or different content. For example, a request for a video signal need not include scaling, slicing, and compression information if one or more of these bandwidth reduction techniques are not to be applied to the video signal.

Other variations are also possible, and various options are described by way of example elsewhere herein.

Example embodiments are described in detail above, primarily in the context of systems. Method embodiments are also possible. See, for example, FIG. 8, which is a flow diagram illustrating a method according to a further embodiment. The example method 800 includes operations that may be performed by different components or systems, to perhaps better illustrate how components or systems interact in an embodiment. It should be noted, however, that embodiments may include additional, fewer, and/or different operations.

Figure 8:
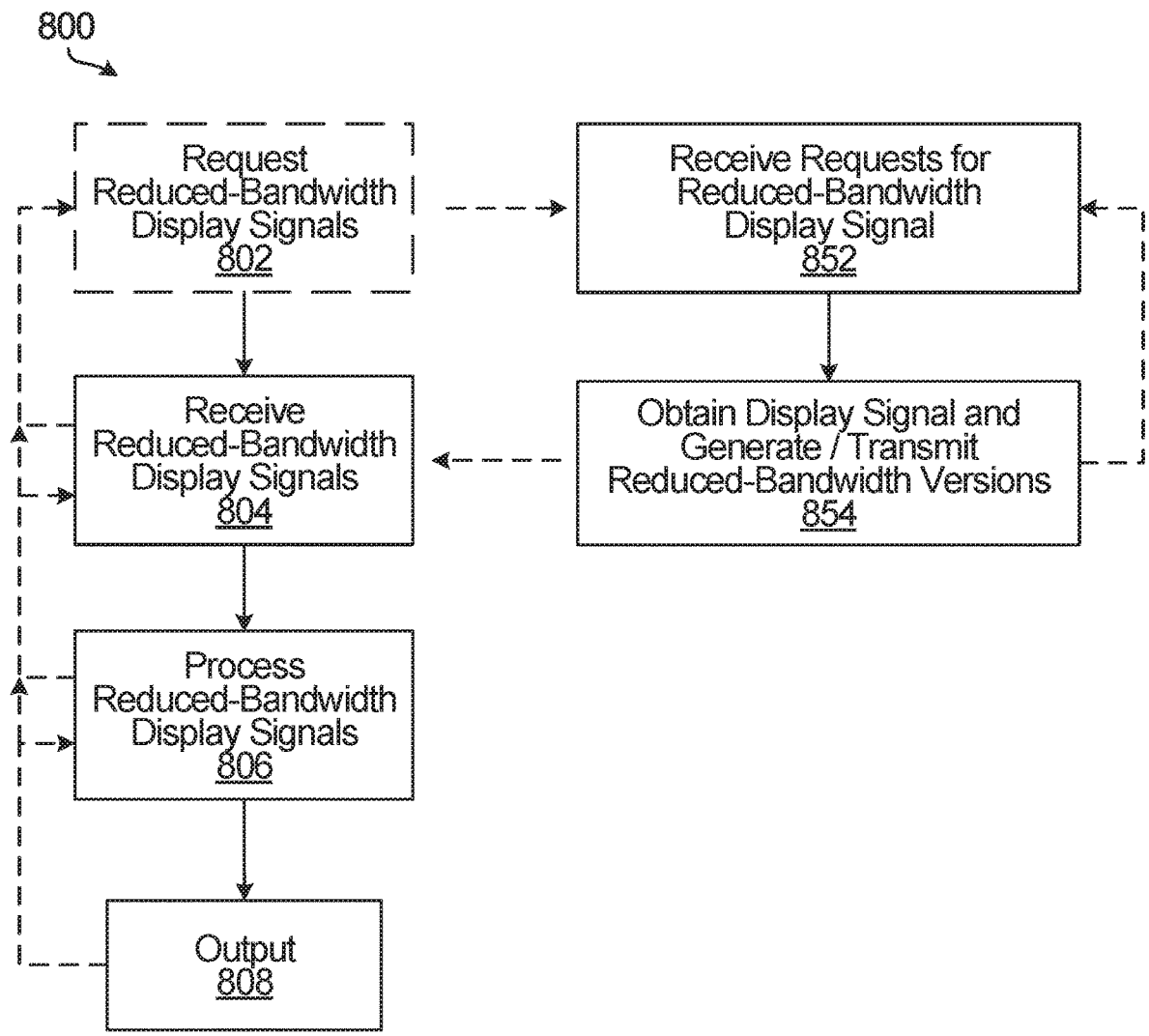
FIG. 8 is a flow diagram illustrating a method according to a further embodiment.

In FIG. 8, 804 represents receiving, at a first computer system, respective reduced-bandwidth versions of display signals that are currently being provided as outputs by a number of second computer systems. User stations and other targets are examples of a first computer system at which the reduced-bandwidth versions may be received at 804. The receiving at 804 need not necessarily be implemented by a computer system itself, and may instead be implemented in an RX unit or receiving unit that is coupled to a computer system, as described at least above. Computer resources and other video sources are examples of second computer systems that are providing the display signals as outputs.

FIG. 8 also illustrates, at 802, requesting the reduced-bandwidth versions that are received at 804. The requesting at 802 may involve transmitting a respective request to each of the second computer systems, with each respective request specifying one or more parameters of bandwidth reduction to be used by each of the second computer systems in generating a reduced-bandwidth version of a display signal. Examples of bandwidth reduction parameters include: scaling parameters, to enable or disable scaling, to indicate a scaled size, to indicate a scaling ratio, and/or to provide other information that is relevant to scaling; slicing parameters, to enable or disable slicing of a video signal into one or more segments, to indicate slice position, to indicate slice size, and/or to provide other information that is relevant to slicing; and compression parameters, to enable or disable compression, to indicate a compression type, and/or to provide other information that is relevant to compression. Other examples of bandwidth reduction parameters are provided elsewhere herein, and at least above in the detailed example of RX unit-TX unit interaction in the case of a change in display layout detected by an RX unit.

Requests may be generated and/or transmitted by a first computer system at which the reduced-bandwidth versions are to be subsequently received at 804, and/or by an associated device or system such as an RX unit or receiving unit that is coupled to the first computer system.

Although the reduced-bandwidth versions are requested in some embodiments, other embodiments in which requests are not required every time reduced-bandwidth versions are to be obtained from video sources are also possible.

Processing of the received reduced-bandwidth versions is shown at 806. The received reduced-bandwidth versions are processed at 806 for output at 808, at the first computer system, of a representation of each of the display signals. Again, like the requesting at 802 and/or the receiving at 804, the processing at 806 may be handled by the first computer system itself and/or by an associated device or system such as an RX unit or receiving unit that is coupled to the first computer system.

Some embodiments involve outputting representations of the display signals at 808, by displaying the representations in an integrated video display screen of a user station or other target. Such representations need not necessarily be displayed, or at least not immediately displayed, after the processing at 806. For example, an RX unit or receiving unit may store processed signals that are ready for output, but not actually display them at all. Processed signals may be stored to a display canvas or other memory for example. Storage may be considered one form of output.

Another example of outputting processed signals at 808 is providing the signals to another device or system. Again, providing signals as outputs need not necessarily involve actually displaying representations of the display signals.

A user station or other target may include one or more displays such as monitors, to display representations of the display signals. Therefore, displaying is one form of outputting, but not all embodiments necessarily involve displaying representations of video signals.

The reduced-bandwidth versions received at 804 may include a scaled version of a display signal, in which case the processing at 806 may involve extracting or otherwise obtaining the scaled version from signaling that is received at 804 from a video source or a transmitting unit that is coupled to a video source, for example. In a display embodiment, the outputting at 808 involves displaying the scaled version as a representation of the display signal.

The received reduced-bandwidth versions may also or instead include a segment of a display signal. The processing at 806 may then involve reconstructing the segment with a remainder of the display signal that is available at the first computer system, to generate a representation of the display signal. The remainder of the display signal may already be available in a display canvas or other memory at the first computer system, for example.

Multiple segments of the same display signal may be received at 804 and processed at 806 to reconstruct the multiple segments with a remainder of the display signals that is available at the first computer system.

Compression is used for bandwidth reduction in some embodiments, and therefore the reduced-bandwidth versions received at 804 may include a compressed version of a display signal. The processing at 806 may then involve decompressing the compressed version to generate a decompressed version of the display signal.

Scaling, slicing into segments, and compression may be applied independently or in any of various combinations. Therefore, the reduced-bandwidth versions received at 804 may include respective versions of display signals that are generated by applying any one or more of the following to each of the display signals: scaling, segmenting, and compression.

Variations of the example receive-side operations 802, 804, 806, 808 are possible. For example, operations may be repeated for different video sources, different video signals, and/or different video segments. This is represented in FIG. 8 by the dashed-line return arrows between 808, 806, 804, 802. In the example shown: operation may return from 808 to 806, 804, 802; operation may return from 806 to 804 or 802, before outputting at 808 is started or completed; and/or operation may return from 804 to 802, before processing at 806 and/or outputting at 808 are started or completed in the example shown.

FIG. 8 also illustrates source-side operations, at 852, 854. A video source such as a computing resource, and/or another component such as a transmitting unit coupled to a video source, may be configured to perform or support the illustrated operations.

852 represents receiving requests for different reduced-bandwidth versions of a display signal. The requests are received at 852 from multiple first computer systems, such as user stations or other targets. The requests may be received at 852 directly from the first computer systems, or through one or more other components such as a receiving unit coupled to a first computer system. One such request is represented by the dashed-line arrow from 802 to 852.

The embodiment illustrated at 852, 854 relates to a scenario in which different reduced-bandwidth versions of a display signal that is currently being provided as an output by a second computer system, such as a video source, are requested. The requests may be received by the second computer system, or by a component such as a transmitting unit that is coupled to the second computer system.

In the embodiment shown, at 854 the display signal is obtained and different reduced-bandwidth versions of that display signal are generated and transmitted to the first computer systems responsive to the requests. The obtaining at 854 may involve obtaining the display signal through a video connection to a video source for example, in the case of a transmitting unit coupled to the video source. Options for generating the reduced-bandwidth versions include any one or more of: scaling, slicing into segments, and compression, as described by way of example elsewhere herein. The transmitting at 854 involves transmission by a transmitting unit to a receiving unit in some embodiments. Again, transmitting units and receiving units are representative of an example implementation, and other embodiments are possible.

The dashed-line arrow between 854 and 804 in FIG. 8 illustrates transmission to one target, and a reduced-bandwidth version of the same display signal is also transmitted to at least one other target as well.

Requests for reduced-bandwidth versions of the display signal need not be received simultaneously or in close succession. For example, requests from different targets may be independent, and may be received and processed at different times. The dashed-line return arrow between 854, 852 is intended to generally represent this.

Variations of the example source-side operations 852, 854 are possible. For example, other source-side features disclosed herein, whether disclosed in the context of methods or in other contexts such as apparatus, systems, and/or devices, may be provided in other method embodiments.

As noted elsewhere herein, embodiments may, but need not necessarily, be implemented in a KVM system. In a KVM embodiment, the first computer system(s) and the second computer system(s) are implemented in a KVM system, as user stations 201, 306*a-b* and computer resources 206, 309*a-c* in FIGS. 2 and 3, for example.

More generally, FIG. 8 is an illustrative example. Other embodiments may include fewer, additional, and/or different operations, performed in a similar order or a different order than shown. Examples of how each operation may be performed, and examples of other operations that may be performed in some embodiments, are disclosed elsewhere herein. Further variations in methods may also or instead be or become apparent to those skilled in the art.

Figure 9:
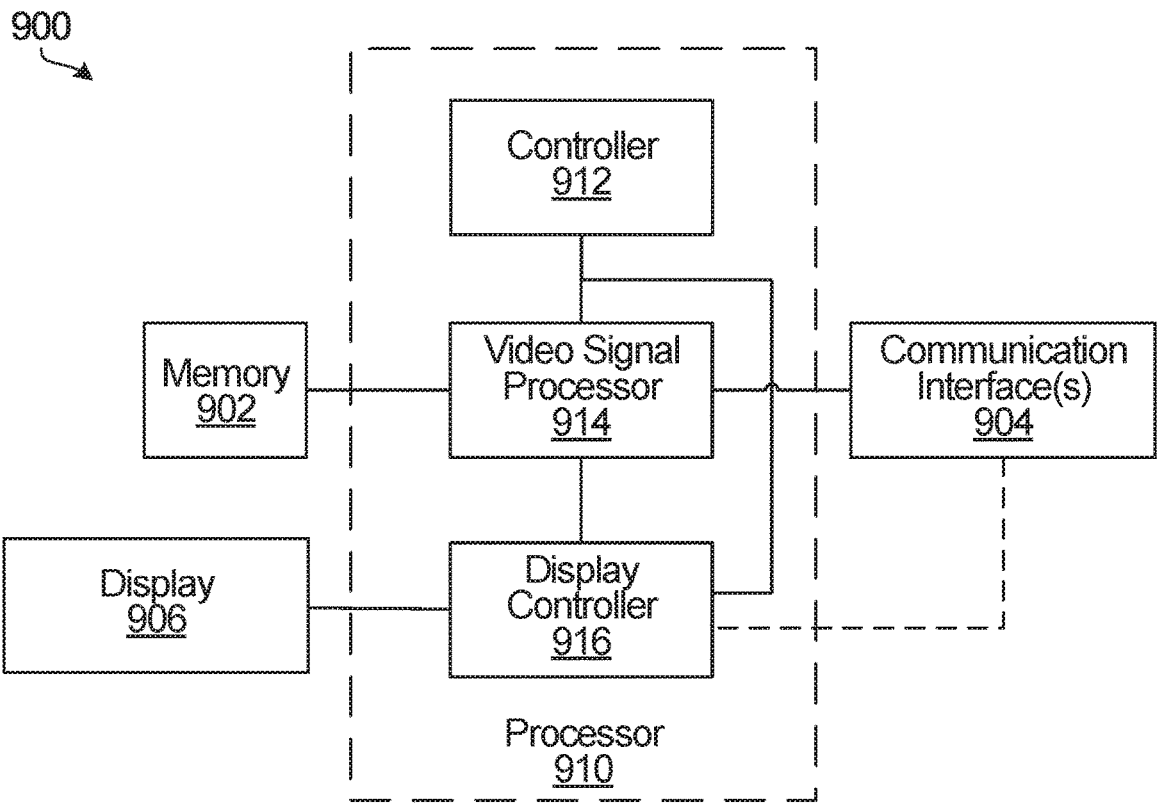
FIG. 9 is a block diagram illustrating an apparatus according to another embodiment.

Apparatus embodiments are also possible. FIG. 9, for example, is a block diagram illustrating an apparatus according to another embodiment. The example apparatus 900 includes a memory 902, a controller 912, a video signal processor 914, a display controller 916, one or more communication interfaces 904, and a display 906, coupled together as shown. The example apparatus 900 may be used in some embodiments to implement an architecture as shown in FIG. 4, with the controller 912 implementing a control subsystem 406, the video signal processor 914 implementing or otherwise supporting one or more video stream processors 408 and possibly one or more decompressors 410, a communication interface 904 implementing the network interface 404, and the display controller 916 implementing or otherwise supporting features associated with displaying representations of video signals on a display 418 (906 in FIG. 9) using a display canvas 412 and a canvas output 416.

The memory 902 includes one or more physical memory devices. Solid-state memory devices such as a Flash memory device, and/or memory devices with movable or even removable storage media, could be implemented. In an embodiment, the memory 902 is a dedicated memory device for storing software and/or data related to signal analysis and computer system monitoring/control. In other embodiments the memory 902 is implemented as addresses or locations in memory that is also used for other purposes. Those skilled in the art will be familiar with various types of memory devices that may be provided at 902.

A processor as shown at 910 represents one example implementation of the combining of the controller 912, the video signal processor 914, and the display controller 916.

More generally, the controller 912, the video signal processor 914, and/or the display controller 916 may be implemented using hardware, firmware, one or more components that execute software, or combinations thereof. Examples of such implementations are provided elsewhere herein.

Examples of communication interfaces 904 that may be provided at a user station or other target, and/or in an RX unit or other receiving unit that is coupled to a target, are also provided elsewhere herein.

The display 906 includes one or more monitors and/or other display devices, and examples of displays are also provided at least above.

As discussed with reference to FIG. 8, for example, not all embodiments necessarily involve displaying representations of a display signal, and in some embodiments processing and display are handled by different components, such as a receiving unit and a user station. It should therefore be noted that some apparatus embodiments do not include a display controller 916 or a display 906. In other embodiments, such features as requesting, receiving, and/or processing video signals are implemented separately from display features, and apparatus such as a user station or other target may include a display controller 916 coupled to communication interface 904 and a display 906, to receive processed signals through the communication interface for display. This is represented in FIG. 9 by the dashed-line connection between the communication interface(s) 904 and the display controller 916.

The apparatus 900 is an example, and other embodiments may include fewer, additional, and/or different components coupled together in a similar or different manner.

Consider first an embodiment in which the video signal processor 914 is coupled to a communication interface at 904, to receive through the communication interface respective reduced-bandwidth versions of display signals that are currently being provided as outputs by multiple computer systems or other video sources. The video signal processor 914 is configured, by executing software stored in the memory 902 for example, to process the received reduced-bandwidth versions for output of a representation of each of the display signals. Processed signals may be stored, in the memory 902 or separately, and/or used by the display controller 916 to display representations of the display signal on the display 906.

The received reduced-bandwidth versions may include a scaled version of a display signal. In order to support bandwidth reduction of a display signal by scaling, the video signal processor 914 may be configured to extract or otherwise obtain the scaled version from signaling that is received through a communication interface 904. In an embodiment in which a representation of the display signal is to be displayed, the display controller 916 is configured to receive the scaled version from the video signal processor 914, and to control the display 906 to display the scaled version as a representation of the display signal.

One or more of the received reduced-bandwidth versions may include a segment of a display signal, in which case the video signal processor 914 is configured to reconstruct a representation of the display signal from the segment and a remainder of the display signal that is available to the video signal processor, from the memory 902 for example.

The received reduced-bandwidth versions may include multiple segments of a display signal. The video signal processor 914 is configured in some embodiments to reconstruct a representation of the display signal, from the received segments and a remainder of the display signal that the video signal processor already has available.

Compression is another option for bandwidth reduction, and in some embodiments the video signal processor 914 is configured to decompress a received compressed version of a display signal to generate a decompressed version of the display signal.

Different bandwidth reduction options may be used in combination. Received reduced-bandwidth versions of display signals may include respective versions of the display signals that have been generated by applying the same or different bandwidth reduction techniques, including any one or more of scaling, segmenting, and compression, to each display signal.

In some embodiments, the reduced-bandwidth versions are received in response to one or more requests. For example, the controller 912, the video signal processor 914, and/or the display controller 916 may be configured to transmit a respective request to each video source. In an embodiment, the controller 912 includes or is coupled to a user interface or to one or more user interface devices (not shown), and converts user manipulations of displayed video signals or display windows into requests for video signals or segments, as described in an example above. The display controller 916 may also or instead detect changes in a display screen. In other embodiments, requests are also or instead handled by the video signal processor 914. Regardless of how requests are generated, each request may specify one or more parameters of bandwidth reduction, and examples of bandwidth reduction parameters are provided elsewhere herein, at least in the above description of FIG. 8

Figure 10:
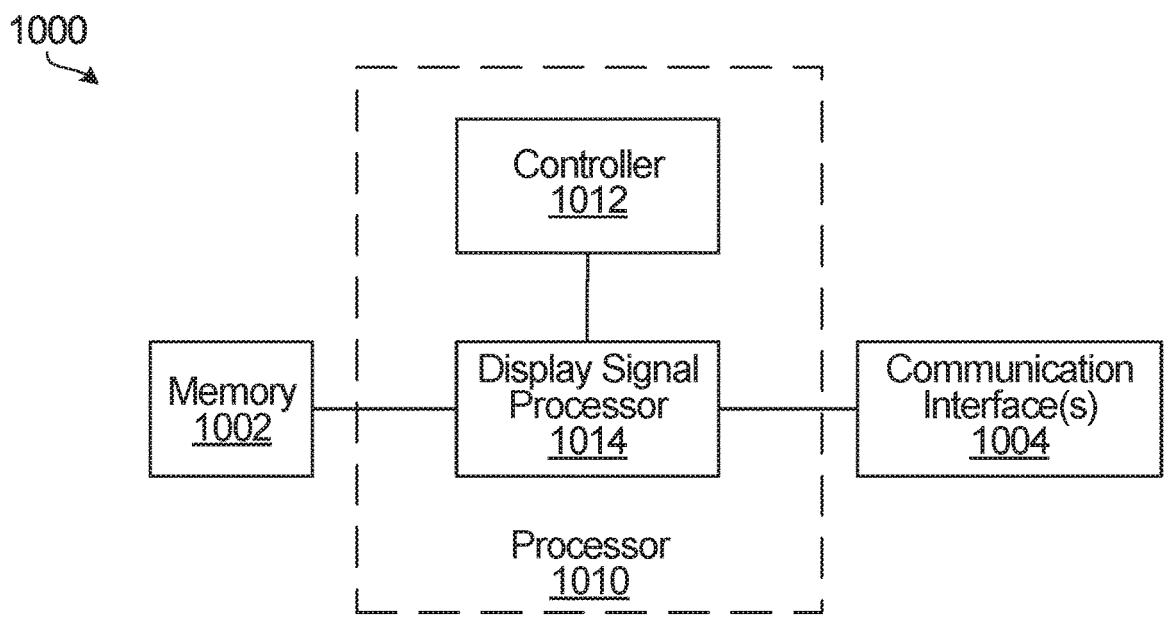
FIG. 10 is a block diagram illustrating an apparatus according to a still further embodiment.

FIG. 10 is a block diagram illustrating an apparatus according to a still further embodiment. The example apparatus 1000 is an example of a source-side apparatus, such as a video source or a transmitting unit, and includes a memory 1002, a controller 1012, a display signal processor 1014, and one or more communication interfaces 1004, coupled together as shown. Other embodiments may include additional, fewer, and/or different components, coupled together in a similar or different manner.

The example apparatus 1000 may be used in some embodiments to implement an architecture as shown in FIG. 6, with the controller 1012 implementing a control subsystem 606, the display signal processor 1014 implementing or otherwise supporting one or more bandwidth reduction subsystems 608, 610, 612, and communication interfaces 1004 implementing the video interface 604 and the network interface 614.

The memory 1002, like the memory 902, includes one or more physical memory devices. The examples provided for memory 902 above also apply to the memory 1002.

The controller 1012 and the display signal processor 1014 may be implemented using hardware, firmware, one or more components that execute software, or combinations thereof. Examples of such implementations are provided elsewhere herein. The processor shown at 1010 is one example implementation of the combining of the controller 1012 and the display signal processor 1014.

Examples of communication interfaces 1004 that may be provided at a computer resource or other video source, and/or in a TX unit or other transmitting unit that is coupled to a video source, are also provided elsewhere herein.

In an embodiment, the display signal processor 1014 is coupled to a communication interface 1004 to receive respective requests, from multiple first computer systems such as user stations and/or other targets, for different reduced-bandwidth versions of a display signal that is currently being provided as an output by a second computer system such as a computer resource or other video source.

The display signal processor 1014 is also configured to generate and transmit, through a communication interface 1004, the different reduced-bandwidth versions of the display signal to the first computer systems responsive to the requests.

It is expected that each request will be received and its corresponding response forwarding the requested reduced-bandwidth version(s) of the display signal will be transmitted through the same communication interface at 1004, but this need not necessarily be the case.

Any of the bandwidth-reduction techniques disclosed herein may be applied to the display signal by the display signal processor 1014. For example, the display signal processor 1014 may be configured to apply any one or more of the following to the display signal to generate the different reduced-bandwidth versions: scaling, segmenting, and compression.

The display signal processor 1014 may be configured to support or perform other operations as well. For example, in a transmitting unit implementation in which request handling is implemented in a transmitting unit or other component that is coupled to a video source, the display signal processor 1014 may obtain a display signal from the video source through a communication interface 1004. The communication interface that is used to obtain the display signal may be the same as or different from the communication interface(s) that are used to receive a request and/or to transmit the requested reduced-bandwidth version(s) of the display signal. An example in which different interfaces are used is shown in FIG. 6, in which a display signal is obtained through the video interface 604, and the network interface 614 is used to receive requests and transmit reduced-bandwidth version(s) of the display signal.

Further variations of the example apparatus 900, 1000 in FIGS. 9 and 10 are possible. For example, other features disclosed herein, whether disclosed in the context of apparatus or in other contexts such as methods, systems, and/or devices, may be provided in other apparatus embodiments. As noted elsewhere herein, embodiments may include, but are not limited to, KVM embodiments for instance.

Embodiments disclosed herein provide novel and unique mechanisms to reduce bandwidth requirements associated with transmitting multiple streams of video, across a computer network to one or more targets for example. A transmitting unit or other video source-side component is used in some embodiments to enable transmission bandwidth reduction by any one or more of pre-scaling, slicing, and/or compression. At a target or receive-side, a receiving unit is used in some embodiments to enable requests to be made for reduced-bandwidth versions, such as pre-scaled, segmented, and/or compressed versions, of one or more video signals. A decompression engine or other form of decompressor may be provided to decompress video signals or segments, which may have also been pre-scaled prior to transmission. Received pre-scaled video signals or segments are assembled onto a display canvas in some embodiments, after decompression if compression was also applied before transmission of a video signal or segment.

Numerous modifications and variations of the present disclosure are possible in light of the above teachings. It is therefore to be understood that within the scope of the appended claims, the disclosure may be practiced otherwise than as specifically described herein.

The divisions of functions represented in the drawings, for example, are solely for illustrative purposes. Other embodiments could include fewer, more, and/or different components than explicitly shown, interconnected in the same or a different order. For example, apparatus components may be configured to perform or enable any of various operations that are disclosed herein, in any of various combinations. Methods could similarly include fewer, more, and/or different operations performed in a similar or different manner than explicitly described herein.

For example, several drawings illustrate separate physical computer systems. A KVM system can also or instead interface to one or more virtual machine systems. In an embodiment, a TX unit does not interface directly to a physical computer system, but instead utilizes a physical network connection to interface to any of several virtual machines hosted on a physical host server. One physical server can host dozens of virtual machines. In such an embodiment, standardized network protocols may be used to communicate with the virtual machine(s) via the TX unit in this example on the physical host server.

In addition, although described primarily in the context of apparatus and methods, other implementations are also contemplated, as instructions stored on a non-transitory processor-readable medium, for example.

According to one such embodiment, a non-transitory processor-readable medium stores instructions which, when executed by a processor, cause the processor to perform a method. The processor may be a processor in a first computer system, and the instructions cause the processor to perform a method that involves receiving, at the first computer system respective reduced-bandwidth versions of display signals that are currently being provided as outputs by multiple second computer systems; and processing the received reduced-bandwidth versions for output, at the first computer system, of a representation of each of the display signals.

According to another embodiment, the instructions cause the processor to perform a method that involves receiving, from multiple first computer systems, respective requests for different reduced-bandwidth versions of a display signal that is currently being provided as an output by a second computer system; and generating and transmitting the different reduced-bandwidth versions of the display signal to the plurality of first computer systems responsive to the requests.

Features disclosed elsewhere herein may be implemented in embodiments relating to a non-transitory processor-readable medium. For example, stored instructions, when executed, may cause a processor to perform or enable any of various operations that are disclosed herein, in any of various combinations.

What is claimed is:

1. A method comprising:
   receiving, at a first computer system, respective reduced-bandwidth versions of respective display signals that are currently being displayed as video outputs by a plurality of second computer systems;
   processing the received reduced-bandwidth versions for output, at the first computer system, of a representation of each of the display signals.

2. The method of claim 1, wherein the received reduced-bandwidth versions comprise a scaled version of one of the display signals.

3. The method of claim 2, further comprising:
   displaying the scaled version as the representation of the one of the display signals.

4. The method of claim 1, wherein the received reduced-bandwidth versions comprise a version that includes a segment of one of the display signals.

5. The method of claim 4, wherein the processing comprises reconstructing, as the representation of the one of the display signals, the segment of the one of the display signals with a remainder of the one of the display signals that is available at the first computer system.

6. The method of claim 1, wherein the received reduced-bandwidth versions comprise multiple versions of one of the display signals, the multiple versions comprising respective segments of the one of the display signals.

7. The method of claim 6, wherein the processing comprises reconstructing, as the representation of the one of the display signals, the respective segments of the one of the display signals with a remainder of the one of the display signals that is available at the first computer system.

8. The method of claim 1, wherein the received reduced-bandwidth versions comprise a compressed version of one of the display signals.

9. The method of claim 8, wherein the processing comprises decompressing the compressed version of the one of the display signals to generate a decompressed version of the one of the display signals.

10. The method of claim 1, wherein the received reduced-bandwidth versions comprise respective versions of the display signals generated by applying segmenting to the display signals.

11. The method of claim 1, further comprising:
requesting the received reduced-bandwidth versions.

12. The method of claim 11, wherein the requesting comprises transmitting a respective request to each of the second computer systems, each respective request specifying one or more parameters of bandwidth reduction to be used by each of the second computer systems in generating a reduced-bandwidth version of one of the display signals.

13. The method of claim 1, wherein the first computer system and the plurality of second computer systems comprise a Keyboard/Video/Mouse (KVM) system.

14. An apparatus comprising:
a communication interface;
a video signal processor, coupled to the communication interface, to receive through the communication interface respective reduced-bandwidth versions of respective display signals that are currently being displayed as video outputs by a plurality of computer systems, and to process the received reduced-bandwidth versions for output of a representation of each of the display signals.

15. The apparatus of claim 14, wherein the received reduced-bandwidth versions comprise a scaled version of one of the display signals.

16. The apparatus of claim 15, further comprising:
a display controller, coupled to the video signal processor, to control a display to display the scaled version as the representation of the one of the display signals.

17. The apparatus of claim 14, wherein the received reduced-bandwidth versions comprise a version that includes a segment of one of the display signals.

18. The apparatus of claim 17, wherein the video signal processor is configured to reconstruct, as the representation of the one of the display signals, the segment of one of the display signals with a remainder of the one of the display signals that is available to the video signal processor.

19. The apparatus of claim 14, wherein the received reduced-bandwidth versions comprise multiple versions of one of the display signals, the multiple versions comprising respective segments of the one of the display signals.

20. The apparatus of claim 19, wherein the video signal processor is configured to reconstruct, as the representation of the one of the display signals, the respective segments of the one of the display signals with a remainder of the one of the display signals that is available to the video signal processor.

21. The apparatus of claim 14, wherein the received reduced-bandwidth versions comprise a compressed version of one of the display signals.

22. The apparatus of claim 21, wherein the video signal processor is configured to decompress the compressed version of the one of the display signals to generate a decompressed version of the one of the display signals.

23. The apparatus of claim 14, wherein the received reduced-bandwidth versions comprise respective versions of the display signals generated by applying segmenting to the display signals.

24. The apparatus of claim 14, wherein the video signal processor is configured to receive the reduced-bandwidth versions in response to one or more requests for the received reduced-bandwidth versions.

25. The apparatus of claim 24, wherein the one or more requests comprise a respective request to each of the computer systems, each respective request specifying one or more parameters of bandwidth reduction to be used by each of the computer systems in generating a reduced-bandwidth version of one of the display signals.

26. The apparatus of claim 14, wherein the plurality of computer systems comprises a Keyboard/Video/Mouse (KVM) system.

27. A non-transitory processor-readable medium storing instructions which, when executed by a processor, cause the processor to perform a method, the method comprising:
receiving, at a first computer system, respective reduced-bandwidth versions of respective display signals that are currently being displayed as video outputs by a plurality of second computer systems;
processing the received reduced-bandwidth versions for output, at the first computer system, of a representation of each of the display signals.

28. A method comprising:
receiving, from a plurality of first computer systems, respective requests for respective different reduced-bandwidth versions of a display signal that is currently being displayed as a video output by a second computer system;
generating and transmitting the respective different reduced-bandwidth versions of the display signal to the plurality of first computer systems responsive to the requests.

29. The method of claim 28, wherein generating the respective different reduced-bandwidth versions comprises applying segmenting to the display signal.

30. An apparatus comprising:
a communication interface;
a display signal processor, coupled to the communication interface, to receive through the communication interface from a plurality of first computer systems respective requests for respective different reduced-bandwidth versions of a display signal that is currently being displayed as a video output by a second computer system, and to generate and transmit through the communication interface the respective different reduced-bandwidth versions of the display signal to the plurality of first computer systems responsive to the requests.

31. The apparatus of claim 30, wherein the display signal processor is configured to apply segmenting to the display signal to generate the respective different reduced-bandwidth versions.

32. A non-transitory processor-readable medium storing instructions which, when executed by a processor, cause the processor to perform a method, the method comprising:
- receiving, from a plurality of first computer systems, respective requests for respective different reduced-bandwidth versions of a display signal that is currently being displayed as a video output by a second computer system;
- generating and transmitting the respective different reduced-bandwidth versions of the display signal to the plurality of first computer systems responsive to the requests.

* * * * *